United States Patent [19]

Nakazato et al.

[11] Patent Number: 5,609,266

[45] Date of Patent: Mar. 11, 1997

[54] REFILLING CONTAINER HAVING FLEXIBLE SHOULDER PORTION MOVABLE BETWEEN SUBSIDED AND EXTENDED POSITIONS

[75] Inventors: Shinsaku Nakazato; Toshiyuki Yokoyama, both of Tokyo, Japan

[73] Assignee: Yoshino Kogyosho Co., Ltd., Tokyo, Japan

[21] Appl. No.: 244,658

[22] PCT Filed: Oct. 14, 1993

[86] PCT No.: PCT/JP93/01475

§ 371 Date: Aug. 9, 1994

§ 102(e) Date: Aug. 9, 1994

[87] PCT Pub. No.: WO94/08860

PCT Pub. Date: Apr. 28, 1994

[30] Foreign Application Priority Data

| Oct. 16, 1992 | [JP] | Japan | 4-078553 U |
| Dec. 15, 1992 | [JP] | Japan | 4-086019 U |
| Dec. 15, 1992 | [JP] | Japan | 4-086020 U |
| Dec. 15, 1992 | [JP] | Japan | 4-086021 U |
| Dec. 15, 1992 | [JP] | Japan | 4-086022 U |
| Dec. 15, 1992 | [JP] | Japan | 4-086023 U |
| Dec. 15, 1992 | [JP] | Japan | 4-334719 |
| Dec. 15, 1992 | [JP] | Japan | 4-334720 |
| Mar. 19, 1993 | [JP] | Japan | 5-060749 |
| May 28, 1993 | [JP] | Japan | 5-028312 U |
| May 28, 1993 | [JP] | Japan | 5-028313 U |

[51] Int. Cl.$^6$ ............................................. B65D 17/28
[52] U.S. Cl. ............................ 220/703; 215/2; 215/47; 220/613; 264/521
[58] Field of Search ............................ 222/575; 215/2, 215/371, 47, 48, 49, 40; 220/703, 604, 612, 613, DIG. 7; 264/500, 502, 521

[56] References Cited

U.S. PATENT DOCUMENTS

| 2,626,647 | 1/1953 | Barton | 220/613 |
| 3,354,603 | 11/1967 | Katzew et al. | 215/2 |
| 4,134,511 | 1/1979 | Deussen | 215/2 |
| 4,154,345 | 5/1979 | Davis et al. | |
| 4,284,199 | 8/1981 | Bigarella | 215/47 |

FOREIGN PATENT DOCUMENTS

| 70129/91 | 8/1991 | Australia . | |
| 58-91526 | 6/1983 | Japan . | |
| 62-78629 | 5/1987 | Japan . | |
| 63-105644 | 7/1988 | Japan . | |
| 63-281952 | 11/1988 | Japan . | |
| 63-176575 | 11/1988 | Japan . | |
| 1095216 | 1/1965 | United Kingdom | 220/612 |

Primary Examiner—Stephen J. Castellano
Attorney, Agent, or Firm—Oliff & Berridge

[57] ABSTRACT

The refilling container of the present invention is a simplified container for use in containing a refilling detergent and the like. A number of the refilling containers can be laied at a limited space. The refilling container can be refilled with a content easily and surely, and can be disposed easily. The refilling container is comprised of a thermoformed container body and a seal film for sealing an opening positioned at the lower end of the container body. A tapered cylindrical shoulder portion is continuously connected to the upper end of the barrel portion of the container body, and from the center portion of the shoulder portion, a nozzle cylinder 4 closed by a platen 21 at the extreme end thereof extends upwardly. In ease of such as refilling a content in the container body or displaying the refilling container after filled with a content, the refilling container is converted to the state of the shoulder portion being subsided in the barrel portion, while in ease of reffilling a content in another container, it is converted to the state of the shoulder portion being projected from the barrel portion and then the extreme end of the nozzle cylinder is cut to form an injection port.

22 Claims, 22 Drawing Sheets

FIG.20
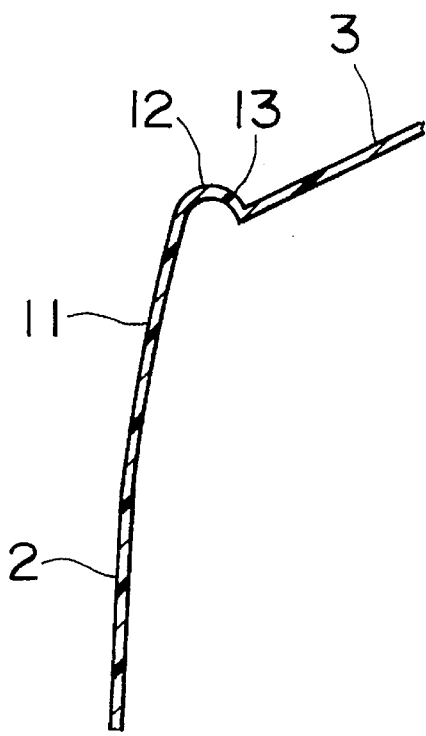
FIG.21
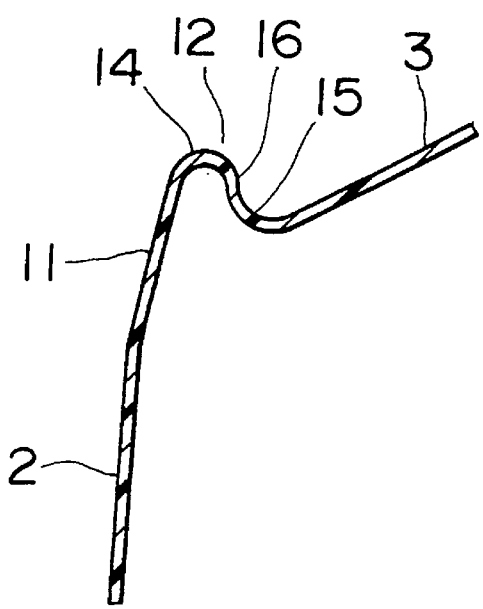
FIG.22
FIG.23
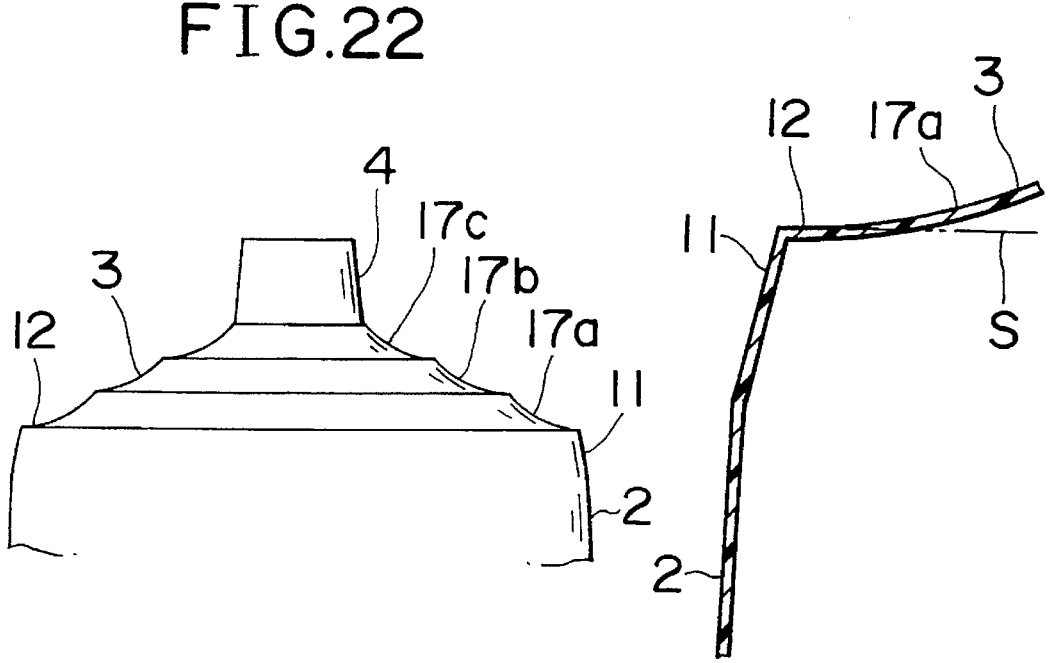

5,609,266

REFILLING CONTAINER HAVING FLEXIBLE SHOULDER PORTION MOVABLE BETWEEN SUBSIDED AND EXTENDED POSITIONS

TECHNICAL FIELD

The present invention relates to a simplified refilling container for use in containing detergents, shampoos and the like.

BACKGROUND ART

Containers for containing detergents, shampoos and the like are required to satisfy the conditions such as (1) being able to fully contain a content, (2) being able to open and close repeatedly, (3) being able to inject a content stably and without troubles, and (4) being easy to handle. As such a container, bottle containers are generally employed in the prior art.

Containers capable of satisfying said conditions are complicated in structure, so that they require many processes in the production thereof and a comparatively great deal of a material in molding the material into one container to thereby increase a unit price of production.

While, said containers can be reused sufficiently without any inconvenience since said conditions are not lost even after the content of the containers was exhausted. However, these containers have hitherto been disposed. As above-mentioned, disposal of the containers does not meet with a requirement to nurse resources and it is difficult to burn out the containers, because these containers are made of a comparatively great deal of a synthetic resin material.

In order to eliminate these disadvantages, a consuming cycle gains public favor, in which a content such as detergents, shampoos and the like is contained in a simplified refilling container and the content contained therein is refilled in said exhausted bottle container to use the same content.

Conventional refilling containers broadly used include self-standing up containers molded in the form of a bag. Such a refilling container has the superior advantages that a unit price of production is extremely low and also it can be easy to dispose.

Though said conventional bag-shaped refilling container is opened by cutting the corner thereof with scissors and the like, the shape of the opening can not be constant in such a manner. When the shape of the opening is not constant as such, a content in the refilling container is spilt outside another container upon refilling it in this another container.

Particularly, in case said another container is a container having a small-sized opening such as a bottle container, the content is easy to be spilt. Further, the refilling container is soft in its entirety and lacks in self-shape holdability, so that the entire container should be supported by both hands during refilling operation. Thus, when the refilling work is effected by one person, another container to be refilled can not be supported by his hands, so that the refilling work of the content should be effected in a unstable state.

In addition, even if the refilling operation is effected while supporting another container by both hands, the refilling operation of the content becomes unstable and thus the content is easy to be spilt since the entire shape of the refilling container is changed as the content flows out and the shape of the opening of the container is also changed in accordance therewith.

Said refilling container is extremely low in self-shape holdability, so that when displayed the container in the state of self-standing up in such as a shop, the refilling container is bent halfway unsightly. Furthermore, there is a problem that only a few commodities (refilling containers) can not be displayed at a given space because these refilling containers can not be stacked one another.

Said refilling containers include also those comprising a bag-shaped container body provided with an injection port having a cap, said injection port consisting of separate parts from said container body. In such a refilling container, there is a fear that not only a producitin cost increases uselessly but also a sealing and containing ability decreases since said injection port capable of repeatedly using is provided in the container body which is throwaway parts.

An object of the present invention is to provide a refilling container excellent in self-shape holdability; capable of refilling a content with ease and success; advantageous in such as transportation, storage and display; and capable of disposing easily, and to provide a method suitable for producing said refilling container.

DISCLOSURE OF THE INVENTION

A refilling container according to the present invention comprises (a) a thin container body and (b) a seal film molten-adhered thereto. Said container body is one prepared by thermoforming a synthetic resin sheet, and this container body is provided with a cylindrical barrel portion of which lower end is opened, an outwardly overhanging-flange formed integrally with and circumferentially of the edge of said opening positioning at the lower end of said barrel portion, a tapered cylindrical shoulder portion continuously connected to the upper end of said barrel portion, a short-cylindrical nozzle cylinder continuously connected to and stood up from the center portion of the shoulder portion, and a platen closing the top of the nozzle cylinder.

Said seal film is molten-adhered to the lower surface of the flange of said container body for sealing up the opening positioned at the lower end of the container body.

The refilling container constructed as above has a high self-shape holdability and is convenient in such as transportation, storage and display.

Preferably, the barrel portion of said container body is shaped in the form of a tapered cylinder, of which taper reduces upwardly in diameter, and is provided with a step portion projecting outwardly at the lower end of the barrel portion, the outer diameter of the step portion being larger than the inner diameter of the opening positioned at the lower end of said barrel portion. This allows to prevent from being strongly fitted in one another so as not to be pulled out, when they were stacked prior to filling a content. The taper of said shoulder portion may be linear or arcuate. Usable cross-sectional shape of the nozzle cylinder may be various shapes such as circular, eliptic, rectangular.

Best ways to use the refilling containers are as follows: Either in case of filling a content in the refilling container, or in case of transporting, storing or displaying the refilling container after filled with a content, these refilling containers are used after said shoulder portion was subsided inside said barrel portion. In case of refilling a content filled in the refilling container into another container, the refilling container is used after said shoulder portion was turned over and projected from the barrel portion.

It is prefered that at least one tapered supplemental shoulder portion, of which taper reduces upwardly in diameter, is formed between said barrel portion and said shoulder portion. This allows to form two or more refraction points between the shoulder portion and the barrel portion to effect said turn-over at these two points, whereby said turn-over action can be effected very easily. In this case, a size relation among the thickness t1 of the flange, the thickness t2 of the step portion, the thickness t3 of the lower portion of the barrel portion, the thickness t4 of the upper portion of the barrel portion, the thickness t5 of the supplemental shoulder portion, the thickness t6 of the shoulder portion and the thickness t7 of the nozzle cylinder is prefered to be t1>t6>t2>t3≧t4≧t5>t7 with the thickness of the flange t1 being prefered to be 0.4 mm–1.0 mm.

It is also prefered to form a reinforcing ring circularly surrounding the shoulder portion between said barrel portion and said shoulder portion. Upon forming the reinforcing ring, said turn-over action of the shoulder portion is ready to be effected and also a strain can not occur at the connected portion of the barrel portion to the shoulder portion. A preferable reinforcing ring have a substantially same surface as a virtual flat surface including the entire outer circumferential edge of the shoulder portion, or a sloped surface sloping downwardly toward the center of the shoulder portion. Said sloped surface can be also constituted by a convex-curved surface upwardly projecting. Said supplemental shoulder portion may be formed between the reinforcing ring and the barrel portion.

Furthermore, the shoulder portion is preferably provided with a reinforcing rib which can be also attained by forming a irregularity pattern on the shoulder portion.

In case of filling a content in said container body, the shoulder portion thereof is turned over and subsided in the barrel portion, the container body is stood up reversely so that the opening at said lower end of the container body be positioned upwardly, and then a content is filled in the container body through said upwardly-positioned opning at the lower end.

After a predetermined amount of content was filled in the container body, said opening at the lower end thereof is sealed by molten-adhering said seal film to the flange of the container body. Thus, the content is sealed and contained in the refilling container.

Upon transporting, storing, or displaying the refilling container in the state of the shoulder portion being subsided inside the barrel portion as above-mentioned, the total height of the refilling container is restrained at a low level so that a space for containing and storing can be reduced. Particularly when the height size of said nozzle cylinder is smaller than that of said shoulder portion, it is more advantageous since the nozzle cylinder does not project from the edge of the upper end of said barrel portion and thus the refilling containers can be stacked one another.

A projected piece projecting downwardly relative to said sealing film is preferably formed circumferentially of said flange. In this case, it is prefered that the downwardly-projecting size of the projected piece is set to a larger value than a deflection value of said seal film deflected downwardly when a content was filled in said container body. This allows to rise the bottom thereof so as not to directly contact the seal film with such as a display rack, whereby the seal film can be prevented from damaging. Further, when the refilling container was such as dropped by mistake, said projected piece acts as a buffer material.

The shape of said projected piece may be either in the form of arc of which section projects downwardly or in the form of bellows extending downwardly. In short, said projected piece may be of any shape, provided that it has a function capable of rising the bottom of the seal film. When the content of the refilling container is refilled in another container such as an empty bottle container, the barrel portion of the container body is pressed by such as gripping it with hands to thereby increase an inner pressure within the container body. Thus, the shoulder portion, which has been turned over and subsided in the barrel portion, is turned over again and returned to a posture projected upwardly with respect to the barrel portion. Then, the upper end portion of the nozzle cylinder projecting from the center of the shoulder portion is cut with scissors and the like to open an injection port. Thereafter, the content of the refilling container is refilled in another container either by placing said opened nozzle cylinder near the mouth of another container or by inserting the former into the latter. During the refilling work, the nozzle cylinder is maintained in a constant cylindrical shape, so that the content is constantly and successfully injected through the nozzle cylinder.

In addition, when the thickness size of the platen of said container body is larger than that of said nozzle cylinder, the nozzle cylinder is easily cut since the platen is tensioned. Further, the nozzle cylinder to be cut can be distinguished from the platen because the platen is thicker, enabling to form a cut opening of a constant shape at a predetermined position.

After the content was completely injected, the refilling container is disposed in a compact shape by crushing it flat. The crushing treatment of the container body is easy since the same body is thinly formed. The crushing is also easy when the seal film is torn prior to crushing.

The present invention provides a method suitable for manufacturing a thin container body made of a resin, said container body being provided with a cylindrical barrel portion; an outwardly overhanging-flange formed integrally with and circumferentially of the edge of an opening positioning at the lower end of the barrel portion; a shoulder portion continuously connected to the upper end of the barrel portion; and a short-cylindrical nozzle cylinder having a top, continuously connected to and stood up from the center portion of the shoulder portion.

In a first manufacturing method, there are used a molding mold having a cavity which has the same shape as the container body and is opened at a corresponding portion to the bottom of said container body; and a plug capable of penetrating into the cavity of the molding mold. According to the first manufacturing method, the container body is manufactured through the steps of:

(a) covering the opening of said cavity of said molding mold with a synthetic resin sheet;

(b) pinching and pressing a predetermined portion of the synthetic resin sheet, said predetermined portion being positioned to be at least circumferential edge portion of the flange of the container body, around the opening of said cavity and between said molding mold and a pressing ring;

(c) pressing said synthetic resin sheet inwardly of said cavity by means of said plug under a heating condition while pressing said predetermined portion of the synthetic resin sheet to be the flange of the container body by means of said pressing ring; and (d) generating a pressure difference between the inside and the outside of said synthetic resin sheet during the step of pressuring by means of said plug to thereby adhere said synthetic resin sheet to the inner surface of said cavity.

In the first manufacturing method, the circumferential edge portion of the flange of the resulting container body can be formed of a non-oriented resin since a tension does not act on the predetermined portion to be at least circumferential edge portion of the flange. The circumferential portion of the flange, said portion being formed of the non-oriented resin, is not broken radially even if an impact caused by such as dropping is impressed thereon.

In the first manufacturing method, it is prefered that the inner diameter of said sheet-pressing ring is substantially-equal to or less than the diameter of the opening of said cavity because this enables to non-orient not only the circumferential edge portion but also the entire flange.

In a second manufacturing method, there are used a molding mold having a cavity which has the same shape as said container body and is opened at a corresponding portion to the bottom of said container body, the inside of said opening of the cavity being provided with a groove going round the opening; and a plug capable of penetrating into the cavity of the molding mold. According to the second manufacturing method, the container body is manufactured through the steps of:

(a) covering the opening of said cavity of said molding mold with a synthetic resin sheet;

(b) pinching and pressing the synthetic resin sheet circumferential of the opening of said cavity, between said molding mold and a sheet-pressing ring;

(c) pressing said synthetic resin sheet inwardly of said cavity by means of said plug under a heating condition while pressing said synthetic resin sheet by means of said pressing ring; and (d) generating a pressure difference between the inside and the outside of said synthetic resin sheet during the step of pressuring by means of said plug to thereby adhere said synthetic resin sheet to the inner surface of said cavity.

In the second manufacturing method, the circumferential portion of the edge of the opening positioned at the lower end of the barrel portion is stretched in both axial and radial directions of the barrel portion, so that the resin forming said circumferential portion may be oriented in longitudinal and horizontal directions. Thus, the strength circumferential of the end of the opening at the lower end of the barrel portion can be increased to cause hard to generate a break.

It is also possible to combine said first manufacturing method with said second manufacturing method. In said first and second manufacturing methods, any suitable means for generating a pressure difference include means for providing a positive pressure in the outside of the synthetic resin sheet by such as supplying a pressurized gas therein, means for providing a negative pressure in the inside of the synthetic resin sheet by such as sucking the interior of the cavity, or means for applying both said negative and positive pressures.

The shape of the plug used in said first and second manufacturing methods may be analogeous to that of the cavity.

BRIEF DESCRIPTION OF THE DRAWINGS

FIG. 20 is an enlarged view showing the end surface circumferential of a reinforcing ring used in a first modification example of the refilling container of Embodiment 5.

FIG. 21 is an enlarged view showing the end surface circumferential of a reinforcing ring used in a second modification example of the refilling container of Embodiment 5.

FIG. 22 is an elevation view showing the upper portion of a third modification example of the refilling container of Embodiment 5 in which a shoulder portion is projected upwardly from a barrel portion.

FIG. 23 is an enlarged view showing the end surface circumferential of a reinforcing ring used in a refilling container of said third modification example.

BEST MODE FOR CARRYING OUT THE INVENTION

Preferable embodiments of the present invention are described hereinafter based on the drawings.

[Embodiment 1]

Figure 1:
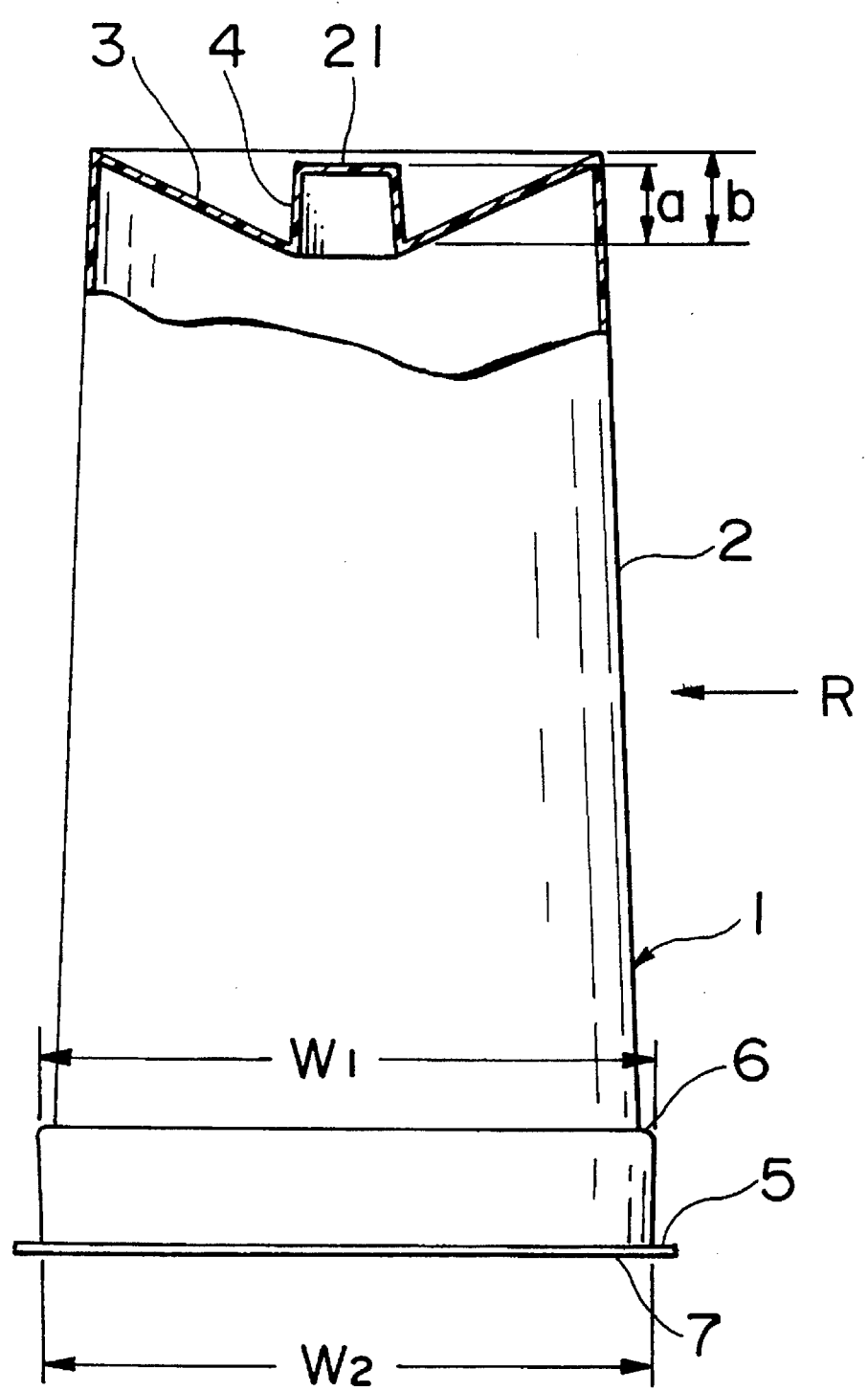
FIG. 1 is an elevational entire view showing breaking a part of the refilling container of Embodiment 1 in which a shoulder portion is subsided in a barrel portion.
Figure 2:
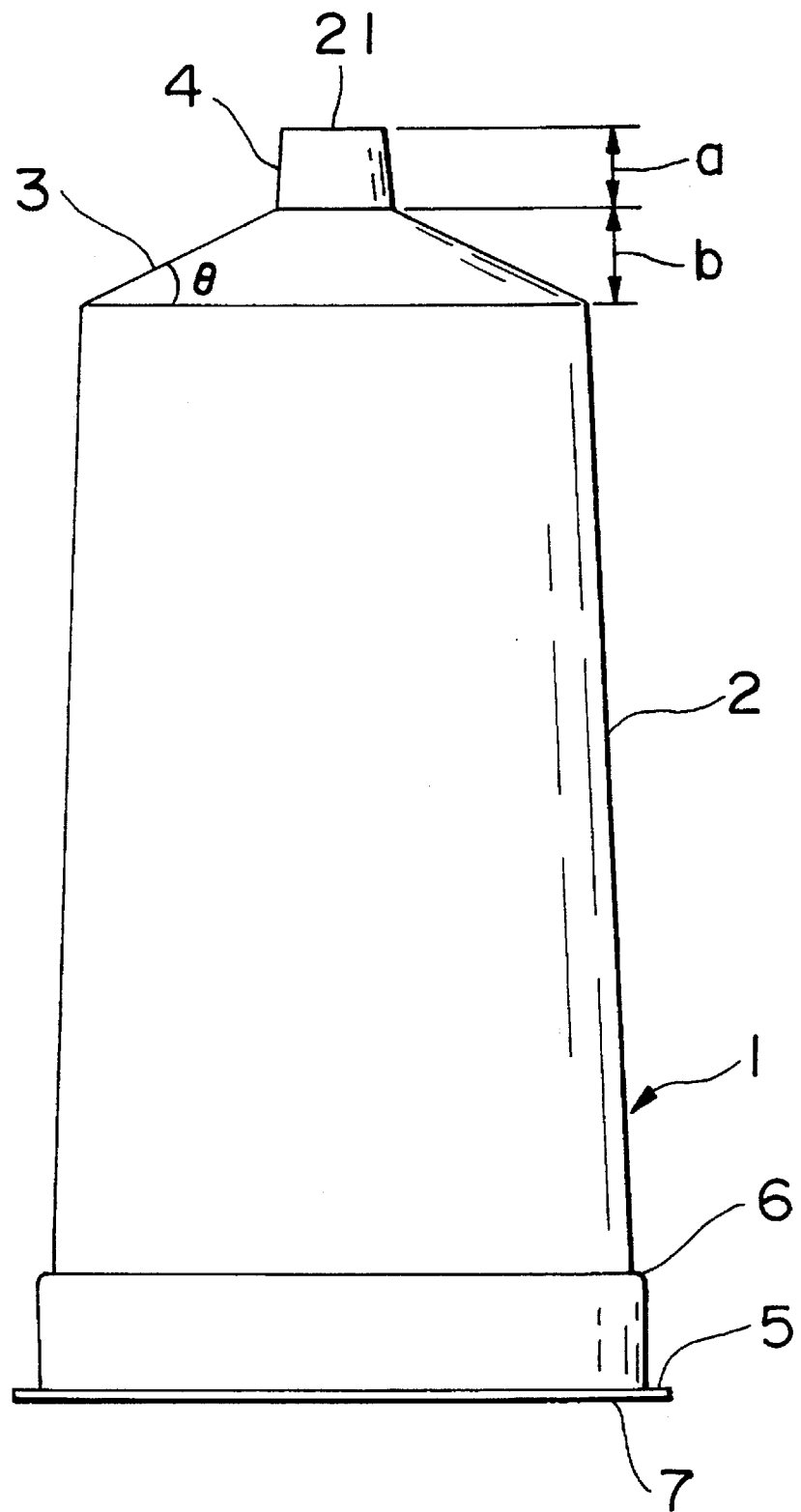
FIG. 2 is an elevational entire view showing the container body of Embodiment 1 in which a shoulder portion is projected upwardly from a barrel portion.

Refilling containers according to Embodiment 1 are explained based on FIGS. 1–7. FIG. 1 is an elevational entire view showing breaking a part of the refilling container of Embodiment 1. The refilling container is provided with a thin container body 1 of which lower end is opened, and a seal film 7 for sealing up the opening positioned at the lower end of the container body 1. FIG. 2 is an elevational entire view showing the container body 1 prior to refilling a content. The container body 1 is one prepared by thermoforming a thin synthetic resin film, and comprises a barrel portion 2, a shoulder portion 3, a nozzle cylinder 4, a flange 5 and a platen 21.

The barrel portion 2 is shaped in the form of a tapered cylinder having a circular cross-section, of which taper reduces upwardly and gradually in diameter, and is opened at the lower end thereof. At the lower end portion of the barrel portion 2, there is formed a step portion 6 of which diameter increases outwardly. The outer diameter $W_1$ of the step portion 6 is designed so as to be larger than the inner diameter $W_2$ of the opening at the lower end of the barrel portion 2. Said flange 5 is formed integrally with and circumferentially of the edge of the opening positioned at the lower end of the barrel portion and overhangs horizontally and outwardly.

Said shoulder portion 3 is shaped in the form of a linearly-inclined tapered cylinder having a circular cross-section and is continuously connected to the upper end of the barrel portion 2. The shoulder portion 3 is designed so that it can be subsided in the barrel portion 2 by turning over downwardly and so that the thus subsided shoulder portion 3 can project again upwardly from the barrel portion 2. A suitable inclined angle θ of the shoulder portion 3 to ensure the turn-over action is 45° or less, and preferably 30° or less.

The nozzle cylinder 4 is shaped in the form of a slightly-tapered short cylinder having a circular cross-section, and is continuously connected to the center portion of said shoulder portion 3 in the posture of standing up. The top of the nozzle cylinder 4 is closed by said platen 21. The height size a of the nozzle cylinder 4 is set to a value smaller than the height size b of the shoulder portion 3.

A container body 1 for cotaining 500 ml (total height: 160 mm, height size b of the shoulder portion 3: 12 mm, height size a of the nozzle cylinder 4: 10 mm) as shown in FIG. 2 was manufactured by thermoforming a single-layered polypropylene sheet having a thickness of 1.50 mm. The even thickness of the shoulder portion 3 of the resulting container body was about 0.37 mm and the even thickness of the continuously connected portion between the barrel portion 2 and the shoulder portion 3, or the upper end portion of the barrel portion 2, was about 0.16 mm.

Since the thickness of the upperr end portion of the barrel portion 2 is sufficiently small as set forth above, the elastic turn-over and deformation of the shoulder portion 3 can be easily and stably accomplished. Since the thickness of the shoulder portion 3 is also relatively large, the turn-over and deformation state of the shoulder portion 3 itself can be stably self-holded. Since the container body 1 is manufactured by thermo-molding, it is obtained at high production efficiency and at low cost. In addition, the container body 1 may be thermoformed from the beginning in the state of the shoulder portion 3 having been subsided in the barrel portion 2.

Figure 3:
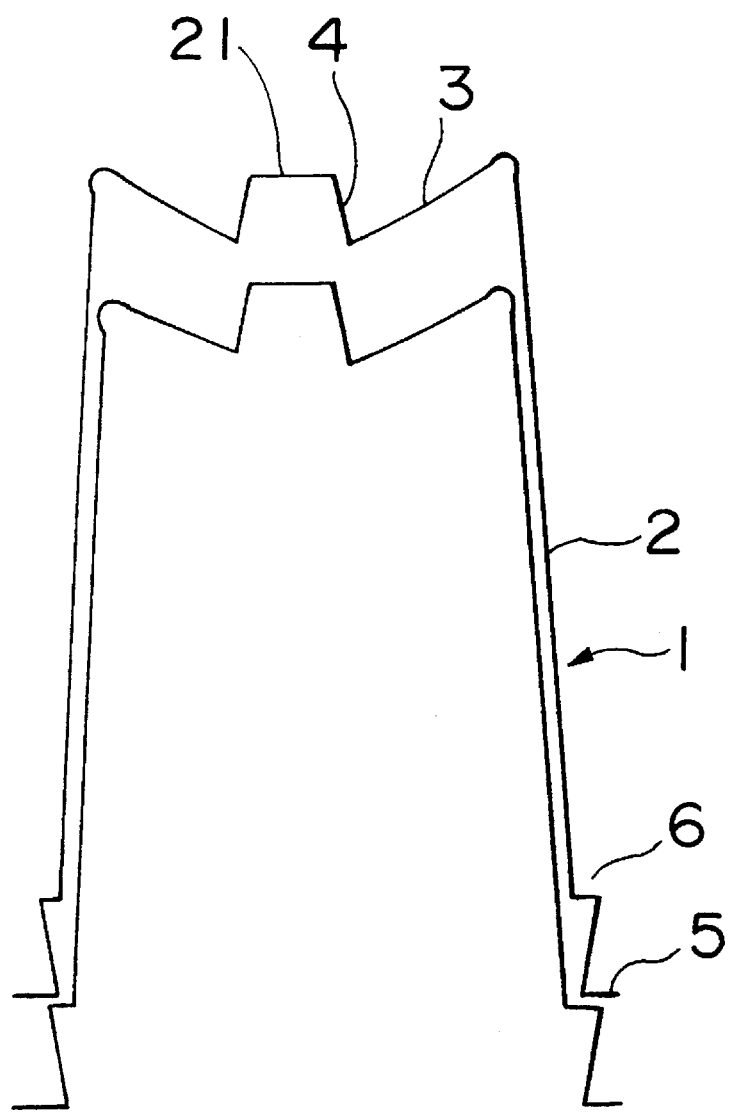
FIG. 3 is a view showing container bodies stacked one aother.

Since the barrel portion 2 of said container body 1 is shaped in the form of a tapered cylinder and is provided with the step portion 6 of which outer diameter $W_1$ is larger than the inner diameter $W_2$ of the opening at the lower end of the barrel portion 2, the container bodies 1 are not fixed into one another so strongly as not to be pulled out when they were stacked prior to filling a content, as shown in FIG. 3.

Said seal film 7 is molten-adhered to all around the bottom surface of the flange 5 of said container body 1 while sealing the opening at the lower end of the container body 1.

The seal film 7 is required to have a high compatibility with the container body 1. Since the seal film 7 forms a "seat" when laied the refilling container on such as a floor while forming a "stacked portion" when stacked the refilling containers one another, as set forth hereinafter, the seal film 7 is also required to have a sufficient mechanical strength to endure the weight of the refilling container.

We, the present inventors, carried out an impact strength test when dropped said 500 ml container body 1 from a height of about 1 m, said container body being filled with a liquid detergent, as a content, and using a layered film, as a seal film 7 assembled with the container body 1. The layered film was prepared by laminating a non-stretched polypropylene layer having a thickness of 0.06–0.08 mm, a nylon layer having a thickness of 0.015–0.025 mm and a polyethylene terephthalate layer having a thickness of 0.012 mm in this order from the side of the container body 1. After repeated said test five times, this seal film 7 exhibited a sufficient strength not to be broken and a stable enduarance even when stacked several number (3–4) of the refilling containers.

In this connection, molding materials for use in the container body 1 and the seal film 7 may include various sheets and films each having required physical properties, without limiting said synthetic resin film of single layer and said multi-layered film. Further, it is desired to decorate the surface of the container body 1 by properly printing thereon.

The thus constituted refilling containers are used in the following manner: Either in case of filling a content in the refilling container, or in case of transporting, storing or displaying the refilling container after filled with a content, these refilling containers are used after said shoulder portion 3 was subsided inside said barrel portion 2. In case of refilling a content filled in the refilling container into another container, the refilling container is used after said shoulder portion 3 was turned over and projected from the barrel portion 2. Details thereof are as follows:

(1) Work for filling a content in the refilling container:

In case of filling a content such as detergents and shampoos in said container body, the shoulder portion 3 thereof is turned over and subsided in the barrel portion 2, the container body 1 is stood up reversely so that the opening at the lower end of the container body 1 be positioned upwardly, and then a content is filled in the container body 1 through the upwardly-positioned opening at the lower end.

After a predetermined amount of content was filled in the container body 1, said opening at the lower end thereof is sealed by molten-adhering said seal film 7 to the flange 5 of the container body 1. Thus, the sealing and containing of the content into the refilling container are accomplished.

(2) Transportation, storage and display of the refilling container:

In case of transporting, storing or displaying the refilling container filled with a content, the refilling container is handled in the state of the shoulder portion 3 of the container body 1 being subsided in the barrel portion 2 as set forth above.

Since the height size a of the nozzle cylinder 4 of the container body is set to a value smaller than the height size b of the shoulder portion 3 as stated above, the edge of the upper end of the nozzle cylinder 4 is designed always to be positioned below relative to the edge of the upper end of the barrel portion 2 in the state of the shoulder portion 3 being subsided in the barrel portion 2, and thus the edge of the upper end of the nozzle cylinder 4 does not project from the edge of the upper end of the barrel portion 2. Accordingly, the refilling containers filled with a content can be stacked one another. Thus, it is very advantageous since a number of the refilling containers can be laied at a limited space and this allows conveniently to transport, store and display them.

Furthermore, since the total height of the refilling container in the state of the shoulder portion 3 being subsided in the barrel portion 2 is as low as (a+b) size relative to the state of the shoulder portion 3 being projected from the barrel portion 2, a space can be utilized efficiently and the refilling container can be also handled efficiently.

(3) Work for refilling a content:

Refilling of the content of the refilling container into an empty bottle container 100 is carried out as follows.

The refilling container in the state as shown in FIG. 1 is pressed by such as gripping it with one hand to act the pressed power R on the barrel portion 2, thereby increasing an inner pressure within the refilling container. Thus, the subsided shoulder portion 3 is turned over and returned to a posture projecting upwardly out of the barrel portion 2 to thereby convert into a shape like in FIG. 2.

Figure 4:
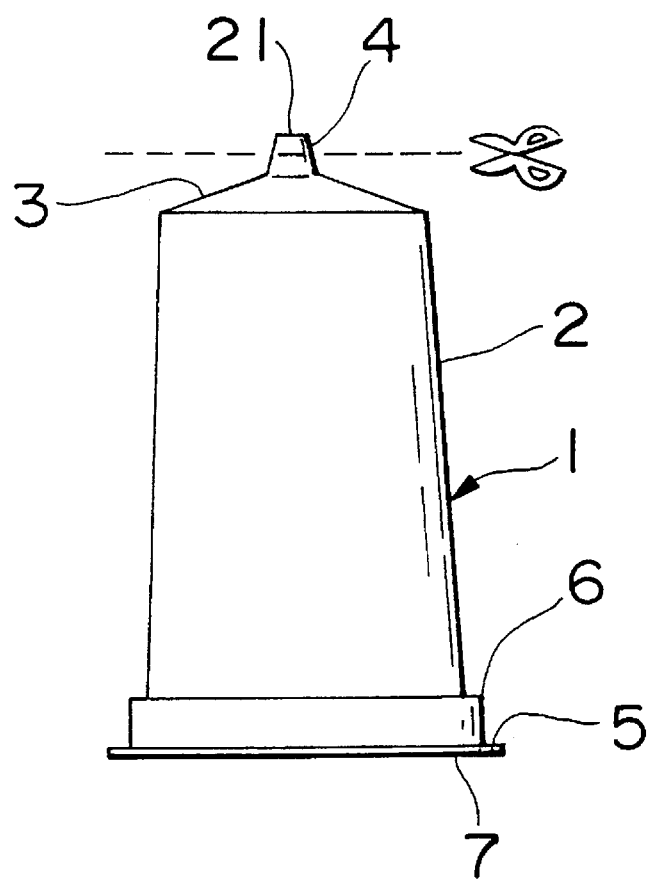
FIG. 4 is an elevation view showing the state of breaking the nozzle cylinder of a refilling container.
Figure 5:
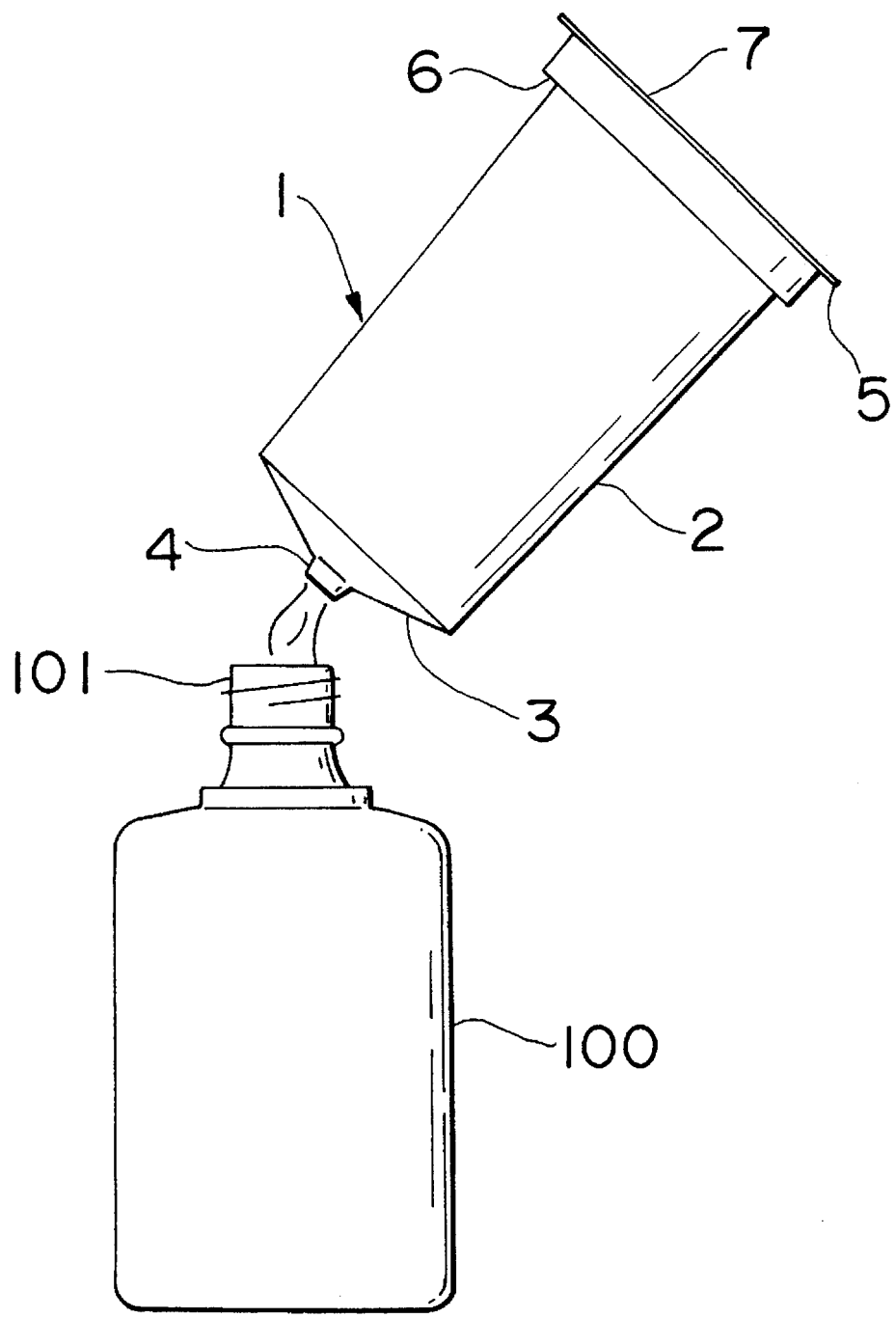
FIG. 5 is a view showing the state of refilling the content of a refilling container in another container.
Figure 6:
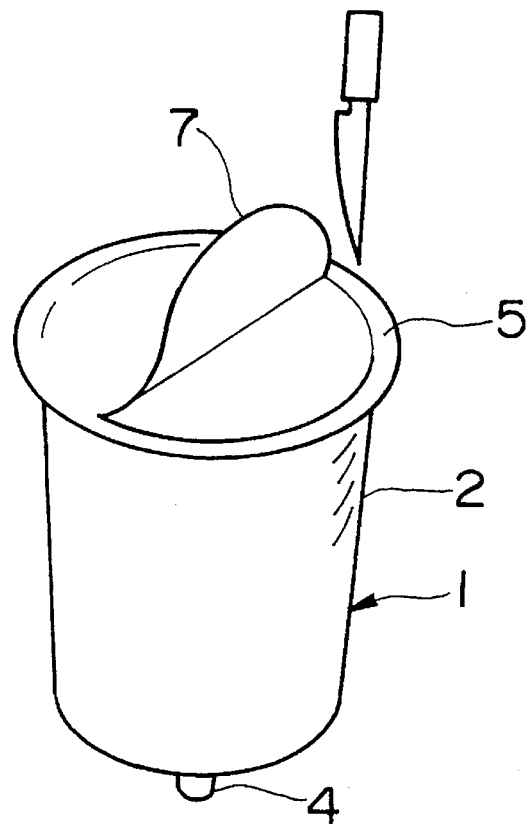
FIG. 6 is a view showing the state of breaking the seal film of an empty refilling container.

Then, the upper end portion of the nozzle cylinder 4 projecting upwardly from the shoulder portion 3 is cut with scissors and the like, as shown in FIG. 4, to open the upper end of the nozzle cylinder 4. Thereafter, refilling of the content is carried out while inclining the refilling container by placing the upper end of the opened nozzle cylinder 4 near the mouth 101 of the empty bottle container 100, as shown in FIG. 5.

At this time, the refilling container 1 exhibits a relatively high self-holdability since it is a thin container but has basically a cylindrical shape inspire of a thin container. Accordingly, there is no fear that, during the refilling work, the refilling container is deformed to make the refilling work difficult. Moreover, said opening of the nozzle cylinder 4 is always maintained in a constant shape and the content is also injected in a constant shape through the opening, so that the refilling work is done easily and the content is hardly to be spilt.

Particularly when the outer diameter of the nozzle cylinder 4 is set to be less than the inner diameter of the mouth 101 of the bottle container 100, the refilling work of the content can be carried out in the state that the nozzle cylinder 4 is fitted into the mouth 101 of the bottle container 100, thus enabling to accomplish more certainly the refilling treatment without spilling the content.

Figure 7:
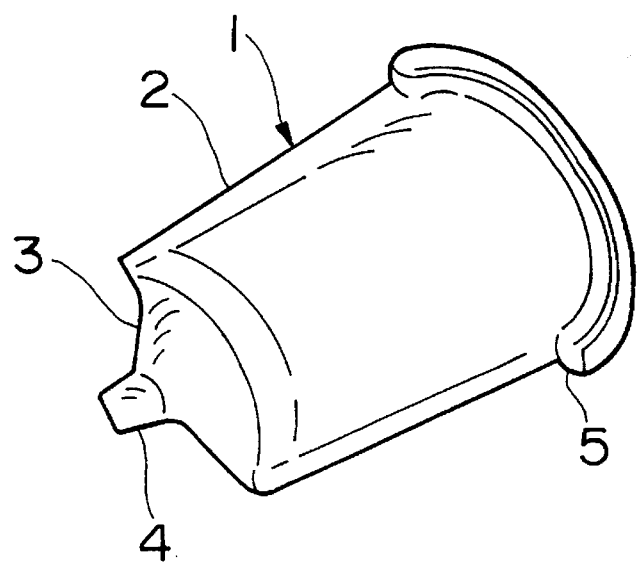
FIG. 7 is a view showing the state of an empty refilling container crushed flat.

(4) Disposal of the refilling container:

When refilling was completed and the refilling container became empty, the entire refilling container is crushed flat and then disposed as shown in FIG. 7. In this case, when the seal film has been previously torn, the container body 1 can be easily crushed. When the refilling container is disposed after crushed as such, the container to be disposed become compact.

[Embodiment 2]

Figure 8:
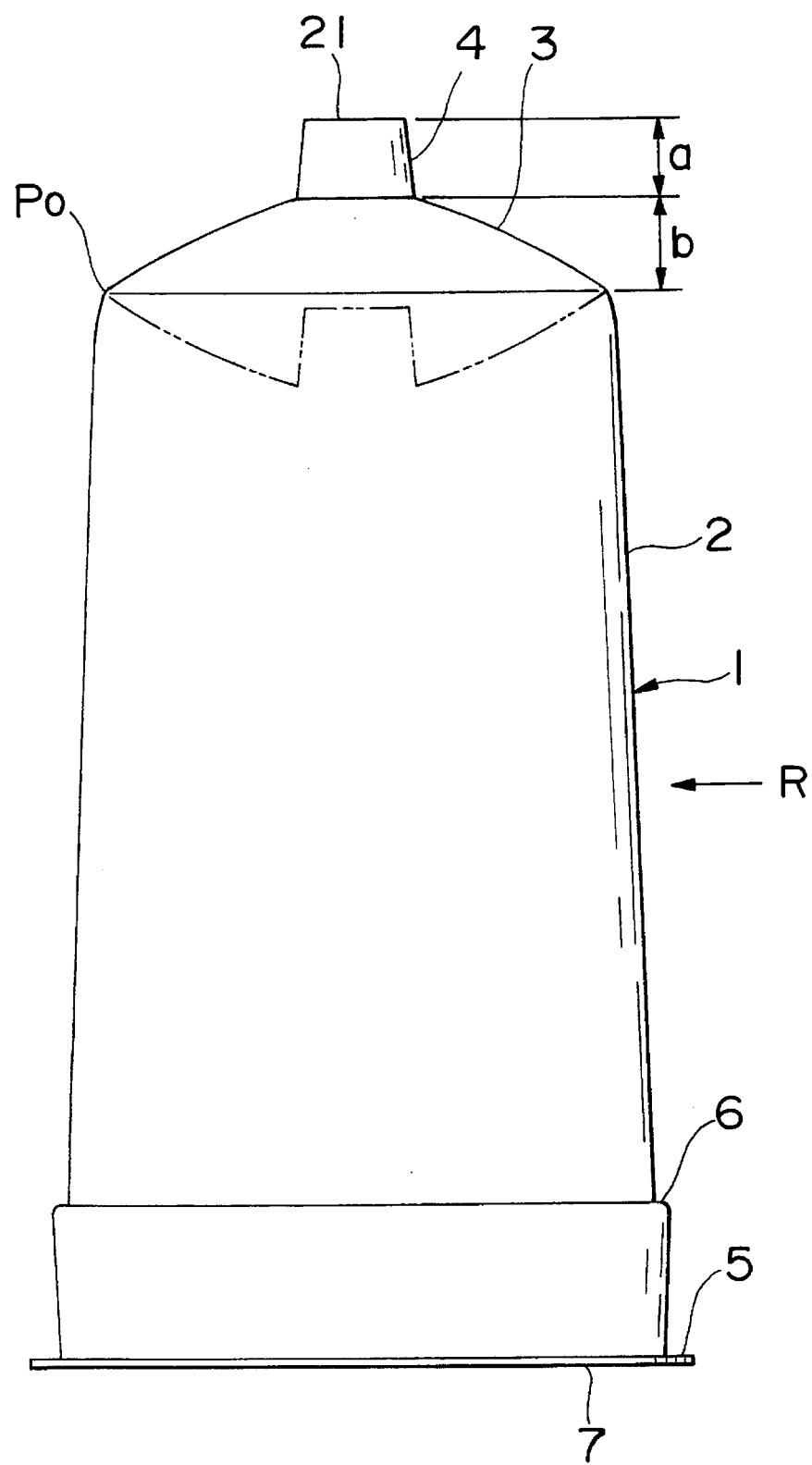
FIG. 8 is an elevational entire view showing the refilling container of Embodiment 2 in which a shoulder portion is projected upwardly from a barrel portion.
Figure 9:
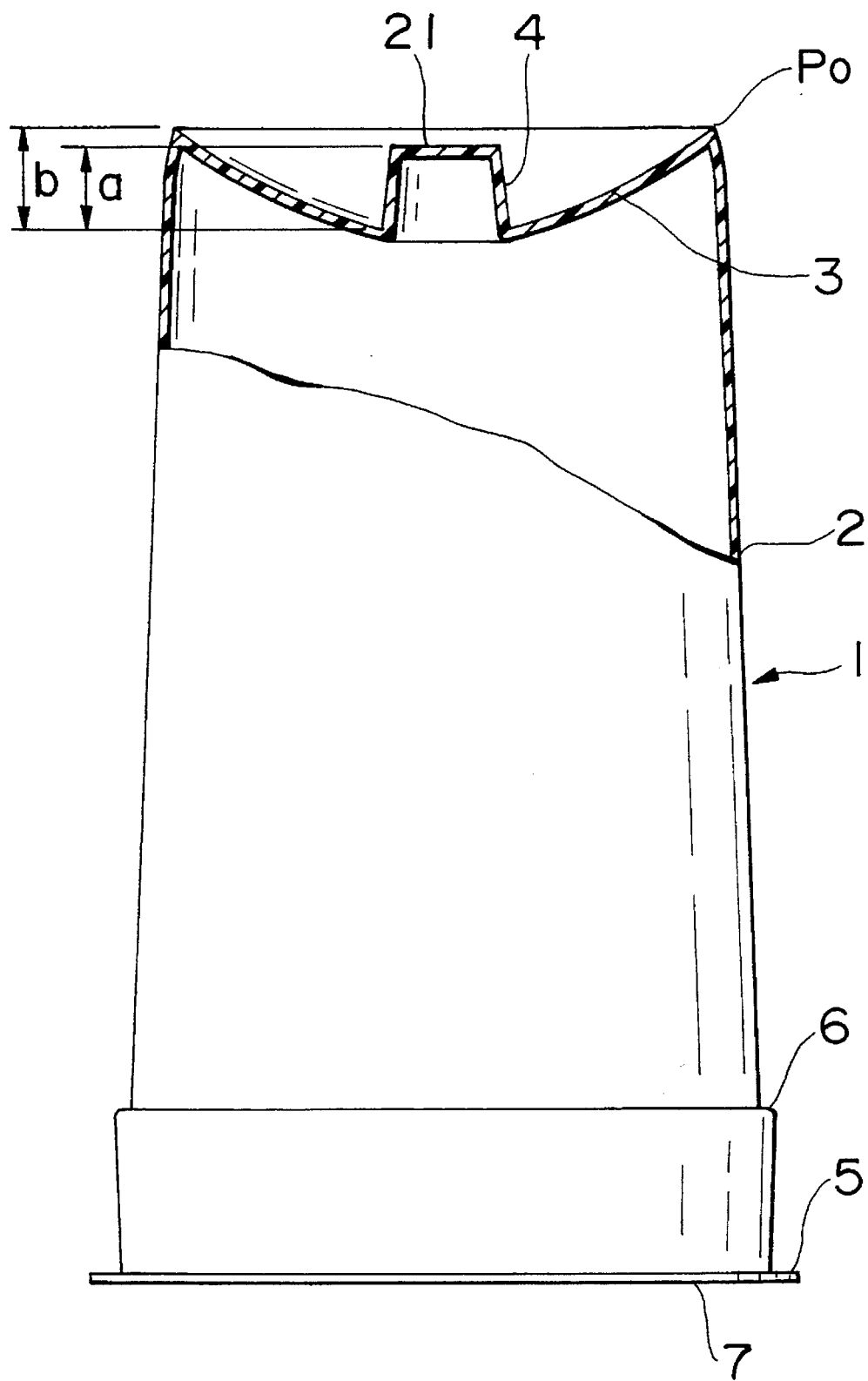
FIG. 9 is an elevational entire view showing breaking a part of the refilling container of Embodiment 2 in which a shoulder portion is subsided in a barrel portion.

A refilling container according to Embodiment 2 is explained based on FIGS. 8 and 9. The basic constitution of the refilling container of Embodiment 2 is the same as that of said Embodiment 1. Differences of Embodiment 2 from Embodiment 1 are explained hereinafter.

The upper end portion of the barrel portion 2 of the container body 1 in this refilling container curves slightly inside as it approaches to the upper edge, and a shoulder portion 3 is continuously connected to the curved upper edge of the barrel portion 2. A refraction point $P_0$ is formed between said upper edge of the barrel portion 2 and the shoulder portion 3. The shoulder portion 3 is shaped in the form of an arcuatelyinclined, tapered cylinder having a circular cross-section.

Also in this Embodiment 2, the shoulder portion 3 is designed to be capable of turning over and subsiding in the barrel portion 2 as shown in FIG. 9, while the subsided shoulder portion 3 is designed to be capable of turning over again and projecting upwardly from the barrel portion 2 as shown in FIG. 8. Since the shoulder portion 3 is shaped in the form of an arcuate taper, the elasticity of the shoulder portion 3 is strengthened and thus the turn-over action thereof is facilitated.

Further, since the upper portion of the barrel portion 2 is curved inside so as to position the refraction point $P_0$ inside, a corner portion between the shoulder portion 3 and the barrel portion 2 of a first container body 1 positioned inside does not be caught on the inner surface of a second container body 1 positioned outside.

[Embodiment 3]

A refilling container accordig to Embodiment 3 is explained based on FIGS. 10–13. The basic constitution of the refilling container of Embodiment 3 is the same as that of said Embodiment 1. Differences of Embodiment 3 from Embodiment 1 are explained hereinafter.

Figure 10:
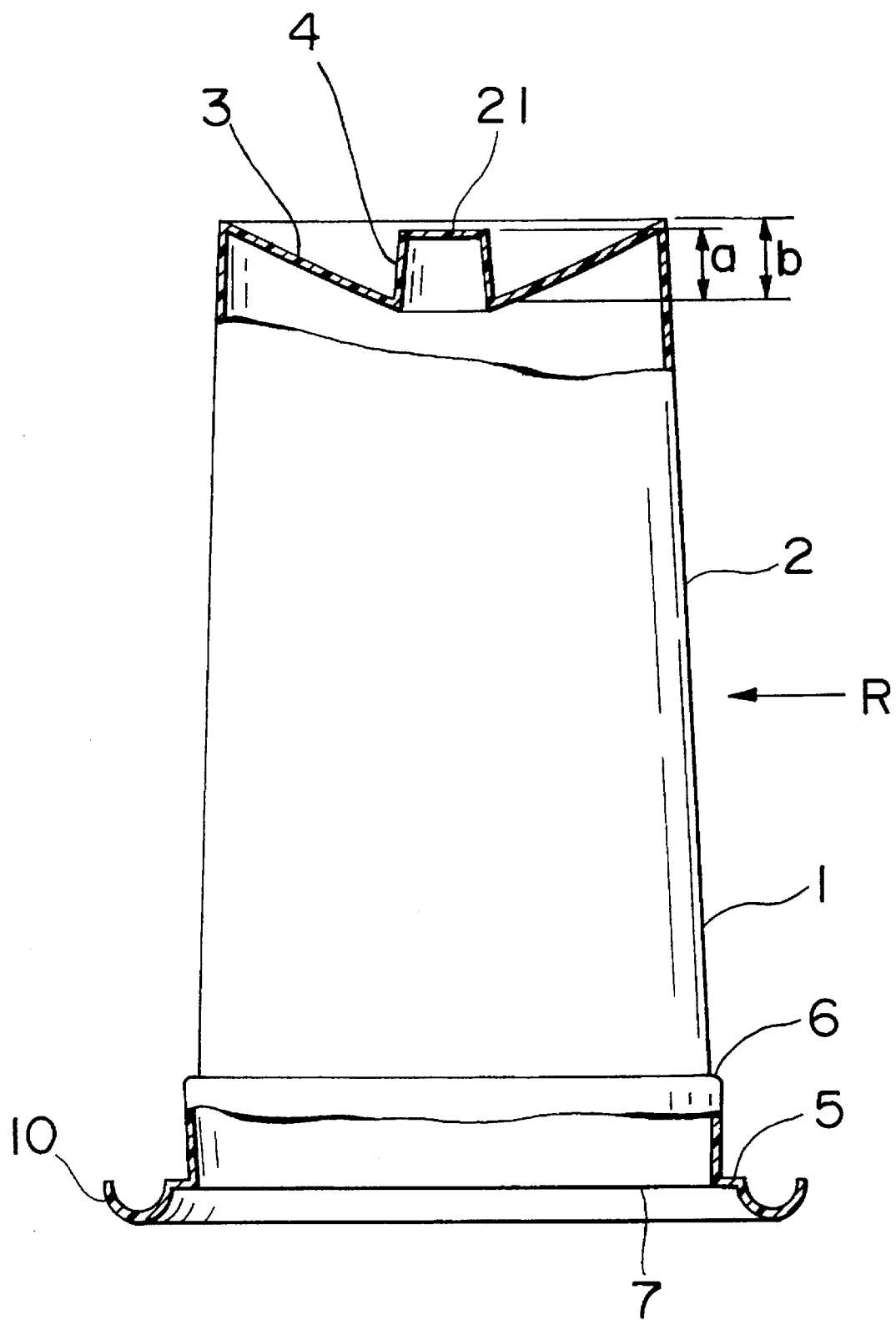
FIG. 10 is an elevational entire view showing breaking a part of the refilling container of Embodiment 3 in which a shoulder portion is subsided in a barrel portion.
Figure 11:
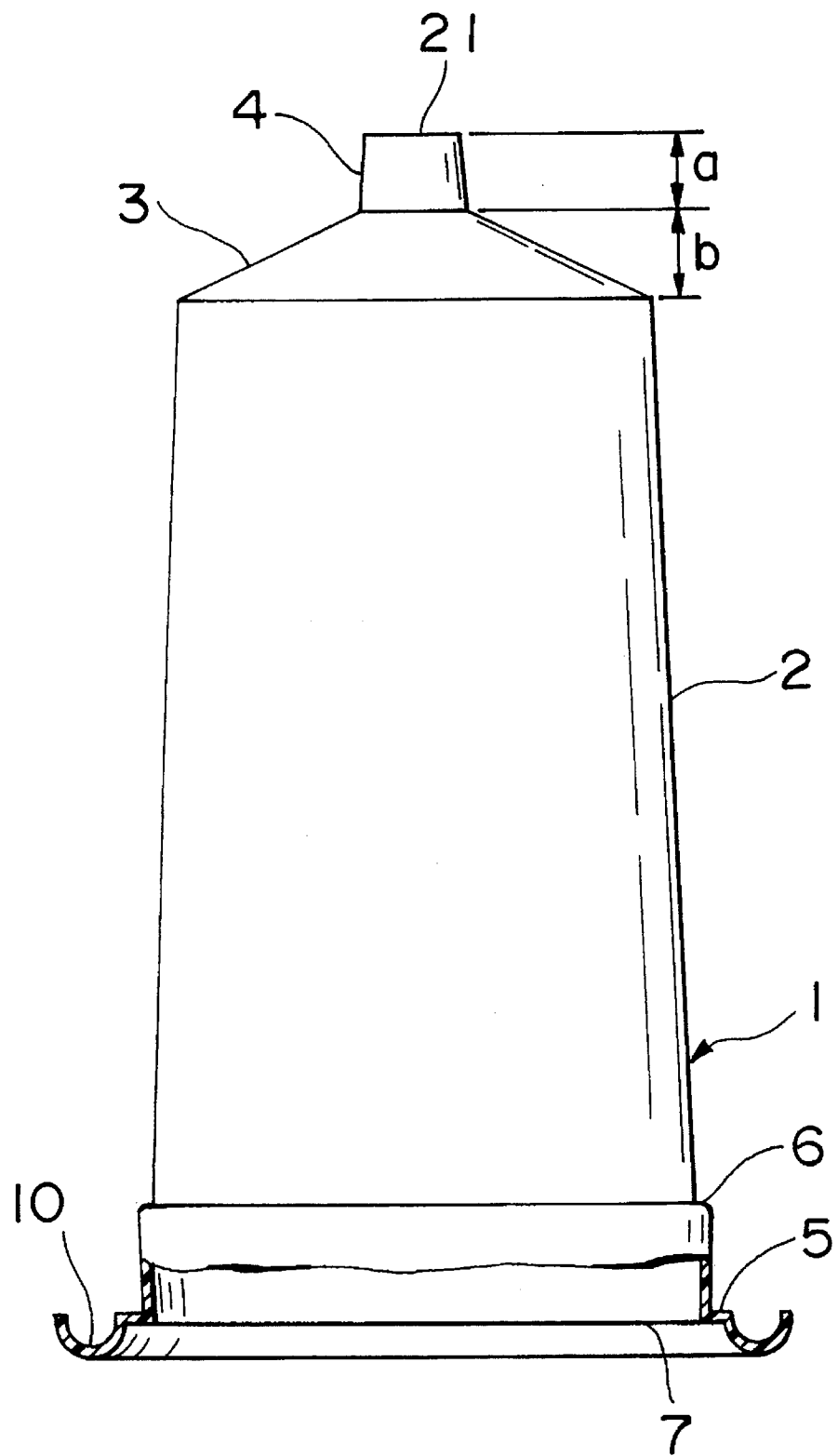
FIG. 11 is an elevational entire view showing the refilling container of Embodiment 3 in which a shoulder portion is projected upwardly from a barrel portion.

FIG. 10 shows the state of the shoulder portion 3 of this refilling container being subsided in the barrel portion 2, and FIG. 11 shows the state of the shoulder portion 3 being projected upwardly from the barrel portion 2.

Figure 12:
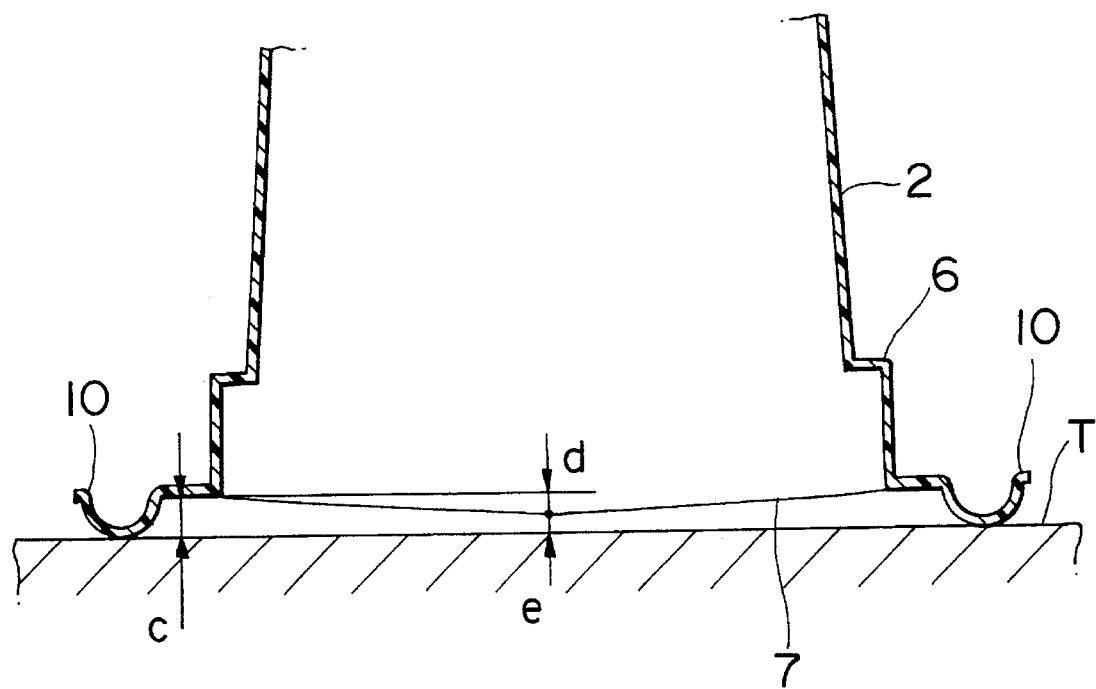
FIG. 12 is an enlarged sectional view showing the lower portion of the refilling container of Embodiment 3.

A projected piece 10 projecting downwardly and having a cross-section of a semi-circular arch is formed around the flange 5 of the container body 1 of the refilling container and is designed to be capable of rising the bottom of a seal film 7. The height size c of the bottom-rising piece 10 is set to a value larger than a deflection value d of said seal film deflected downwardly when a content was filled in the container body 1 so that a clearance e is formed between a floor surface T and the seal film 7 when the refilling container was placed on the floor surface T, as shown in FIG. 12.

Since the bottom of the seal film 7 is rised by the projected piece 10, the seal film 7 does not be damaged by contacting with the floor surface T. Further, even when the refilling container was such as dropped by mistake, said projected piece acts as a buffer material to thereby improve the impact resistance of the container body 1.

Figure 13:
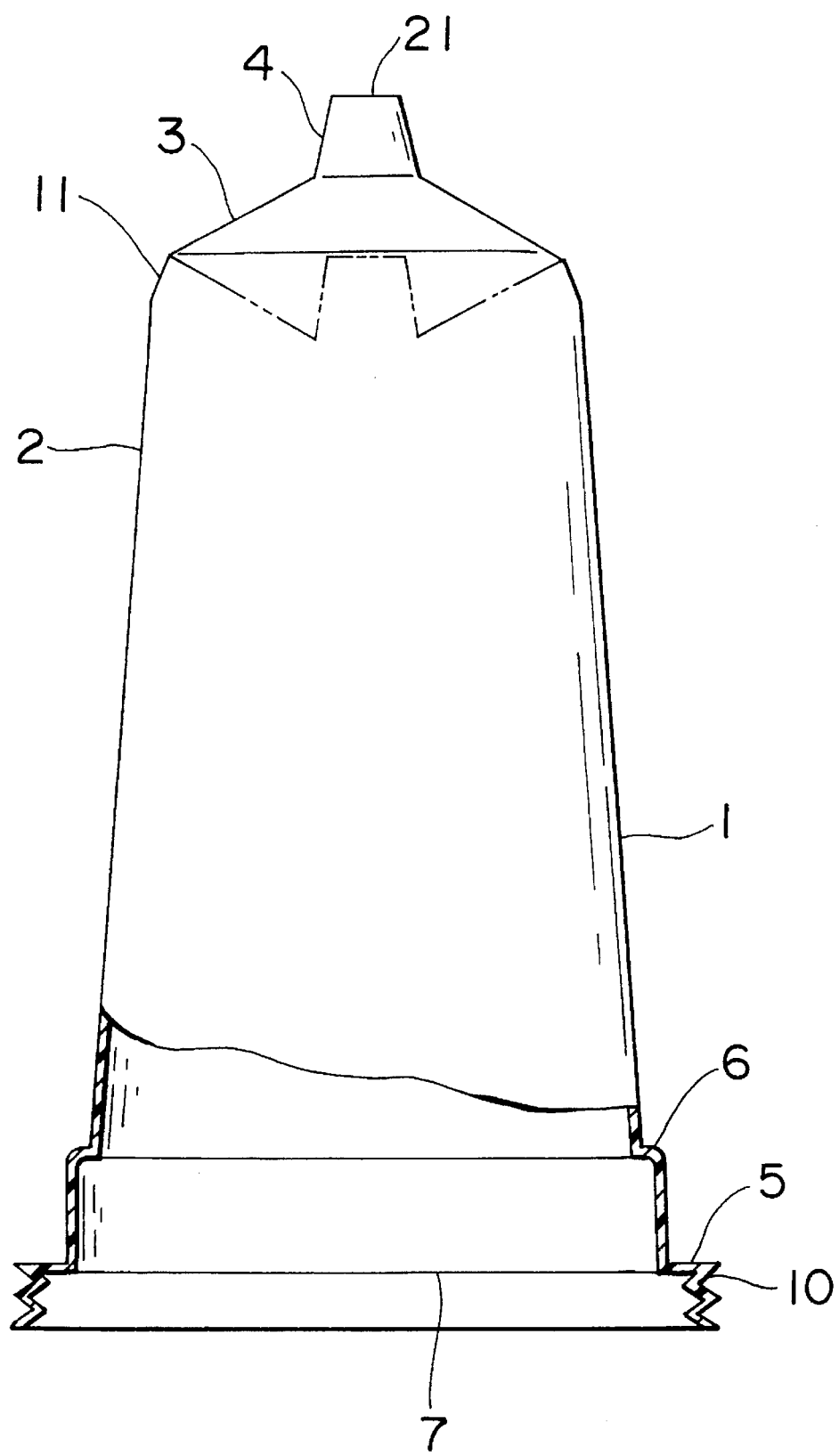
FIG. 13 is a view showing breaking a part of a modification example of the refilling container of Embodiment 3 in which a shoulder portion is projected upwardly from a barrel portion.

The sectional shape of the projected piece 10 does not be limited to semi-circular arch but various shapes may be employed. FIG. 13 shows an example of the sectional shape being in the form of bellows. In addition, a supplemental shoulder portion 11 is provided between the barrel portion 2 and the shoulder portion 3 in the container body shown in FIG. 13. This supplemental shoulder portion 11 is detailed in Embodiment 4.

[Embodiment 4]

A refilling container accordig to Embodiment 4 is explained based on FIGS. 14–17. The basic constitution of the refilling container of Embodiment 4 is the same as that of said Embodiment 1. Differences Embodiment 4 from Embodiment 1 are explained hereinafter.

Figure 14:
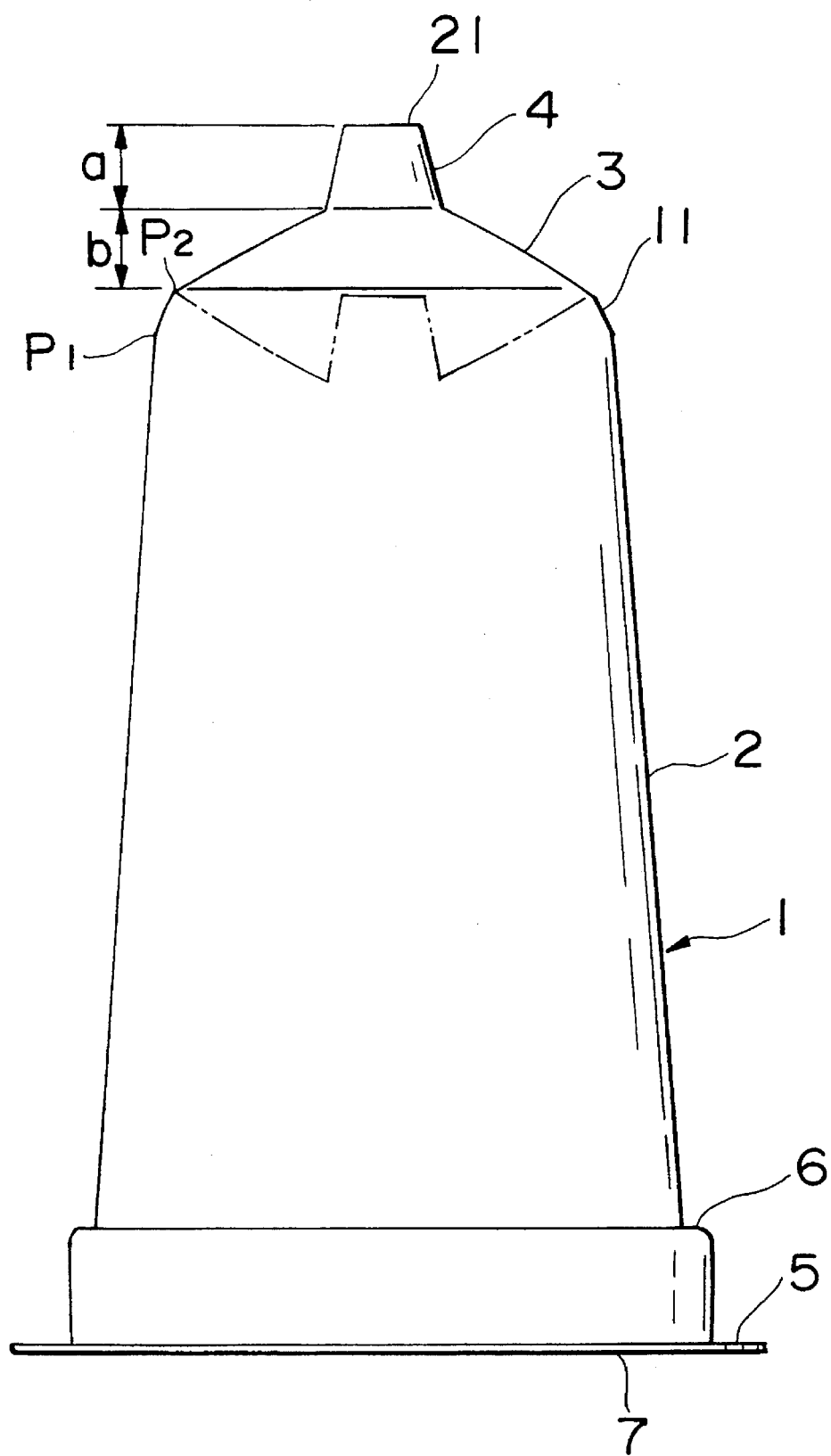
FIG. 14 is an elevational entire view showing the refilling container of Embodiment 4 in which a shoulder portion is projected upwardly from a barrel portion.
Figure 15:
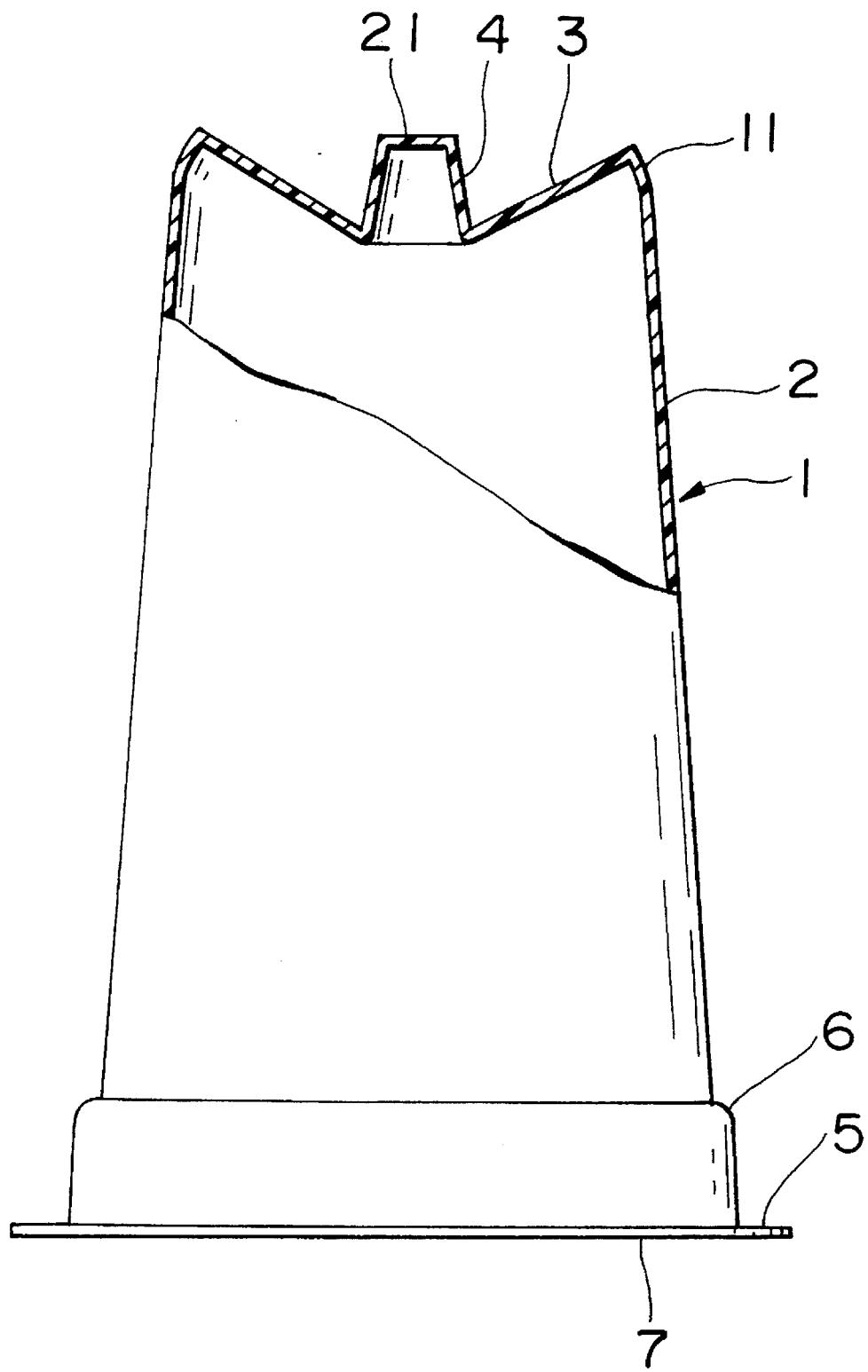
FIG. 15 is an elevational entire view showing breaking a part of the refilling container of Embodiment 4 in which a shoulder portion is subsided in a barrel portion.

FIG. 14 shows the state where the shoulder portion 3 of the refilling container projects upwardly from the barrel portion 2, and FIG. 15 shows the state of the shoulder portion 3 being subsided in the barrel portion 2.

In the container body 1 of this refilling container, a supplemental shoulder portion 11, of which diameter reduces upwardly, is formed between the barrel portion 2 and the shoulder portion 3. A boundary between the supplemental shoulder portion 11 and the barrel portion 2 corresponds to a first refraction point $P_1$, and a boundary between the supplemental shoulder portion 11 and the shoulder portion 3 corresponds to a second refraction point $P_2$.

By forming the supplemental shoulder portion 11 to provide two refraction points $P_1$ and $P_2$ of which refraction point $P_2$ is arranged inside, the turn-over of the shoulder portion 3 is effected at these two refraction points $P_1$ and $P_2$ when the shoulder portion 3 was subsided in the barrel portion 2, whereby the turn-over action can be effected very easily.

Furthermore, by arranging the refraction point $P_2$ inside, the outward overhang of a boundary portion between the shoulder portion 3 and the barrel portion 2 when the shoulder portion 3 was subsided in can be decreased. Accordingly, when the container bodies 1 prior to filling a content were stacked as shown in FIG. 3, there is no fear that the boundary portion between the shoulder portion 3 and the barrel portion 2 of a first container body 1 positioned inside is caught on the inner surface of the barrel portion 2 of a second container body 1 positioned outside and thus it becomes difficult to pull out these container bodies one another.

In this refilling container, the flange 5 is a portion to be the base of the container body 1 as well as a most important portion to be a seal portion after filled with a content. For this purpose, the thickness t1 of said flange 5 is prefered to be 0.4 mm–1.0 mm.

A size relation among the thickness t1 of the flange 5, the thickness t2 of the step portion 6, the thickness t3 of the lower portion of the barrel portion 2, the thickness t4 of the upper portion of the barrel portion 2, the thickness t5 of the supplemental shoulder portion 11, the thickness t6 of the shoulder portion 3, the thickness t7 of the nozzle cylinder 4 and the thickness t8 of the platen 21 is prefered to be $t1 > t6 > t2 > t3 \geq t4 \geq t5 > t7 < t8$.

The shoulder portion 3 is desired to be thin in order to easily turn over and subside in. In case the shoulder portion 3 is too thin, however, either the shoulder portion 3 sometimes deforms partially due to such as thermal expansion of a content during storing the content after the shoulder portion 3 was turned over and subsided in and then the content was filled in the container body i and thereafter the opening at the lower end of the container body 1 was sealed with the seal film 7, or the shoulder portion 3 sometimes projects on and returns as it was, due to the weight of the content itself against the will of a user, so that the thickness thereof can not be smaller than a thickness to be required. For this reason, it is desired that the thickness t6 of the shoulder portion 3 is large next to the thickness t1 of the flange 5.

The step portion 6 is a portion having a reinforcing role for preventing deformation. For this reason, the thickness t2 of the step portion 6 is smaller than the thickness t1 of the flange 5 but is larger than the thicknesses t3, t4 of the barrel portion 2. The thicknesses t3, t4 of the barrel portion 2 and the thickness t5 of the supplemental shoulder portion 11 are required to be a thickness so as not to cause buckling when the shoulder portion 3 was subsided in the barrel portion 2.

Figure 16:
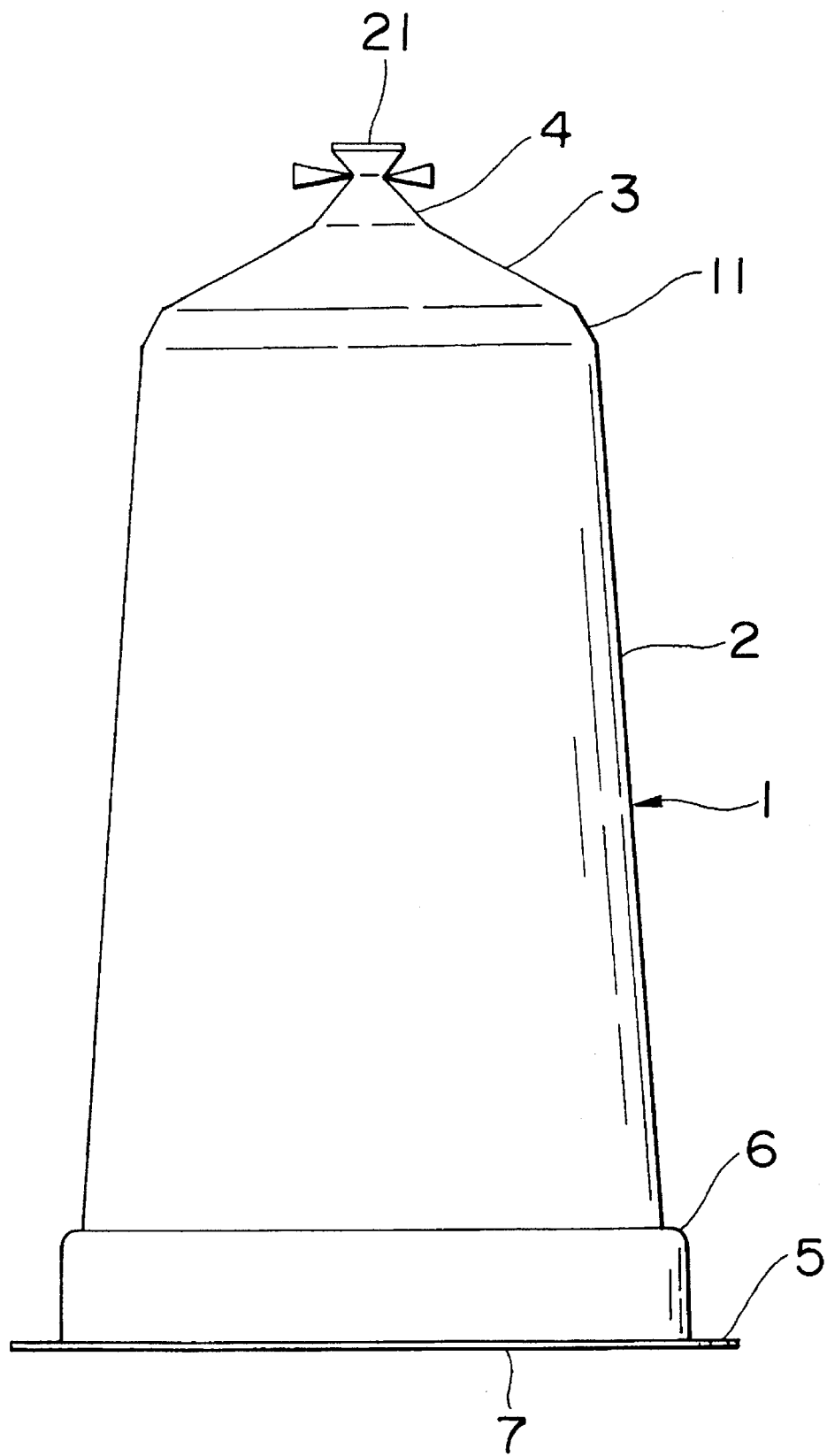
FIG. 16 is an elevation view showing the state of breaking the nozzle cylinder of a refilling container of Embodiment 4.
Figure 17:
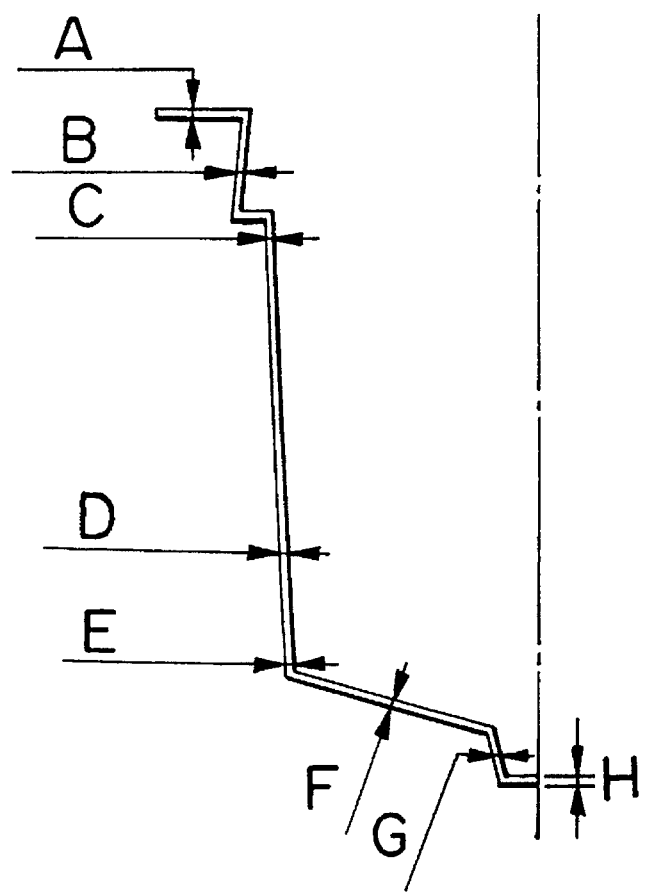
FIG. 17 is a half sectional view showing positions for measuring the thickness of a container body.

In case the thickness t7 of the nozzle cylinder 4 is smaller than the thickness t8 of the platen 21, the platen 21 is tensioned so that the nozzle cylinder 4 is easily cut when cut with scissors and the like, as shown in FIG. 16. Further, the nozzle cylinder 4 to be cut can be easily distinguished from the platen 21, enabling to form a cut opening of a constant shape at a predetermined position.

A container body 1 for cotaining 500 ml (total height: 160 mm, height size b of the shoulder portion 3: 12 mm, height size a of the nozzle cylinder 4: 10 mm) as shown in FIG. 14 was manufactured by thermoforming a single-layered polypropylene sheet having a thickness of 1.50 mm. The thicknesses of A–H positions shown in FIG. 17 were measured with the results being shown in the following Table 1. A container body 1 manufactured by thermo-form molding a single-layered polyethylene terephthalate sheet having a thickness of 1.50 mm had also substantially the same thicknesses as above.

In this container body 1, since the thickness of from the upper end portion of the barrel portion 2 to the shoulder portion 2 is sufficiently small, the elastic turn-over and deformation of the shoulder portion 3 can be easily and stably accomplished.

TABLE 1

|   | Thickness (mm) |
|---|---|
| A | t1 = 1.00 |
| B | t2 = 0.25 |
| C | t3 = 0.22 |
| D | t4 = 0.15 |
| E | t5 = 0.15 |
| F | t6 = 0.36 |
| G | t7 = 0.11 |
| H | t8 = 0.15 |

[Embodiment 5]

A refilling container accordig to Embodiment 5 is explained based on FIGS. 18–27. The basic constitution of the refilling container of Embodiment 5 is the same as that of said Embodiment 4. Differences of Embodiment 5 from Embodiment 4 are explained hereinafter.

Figure 18:
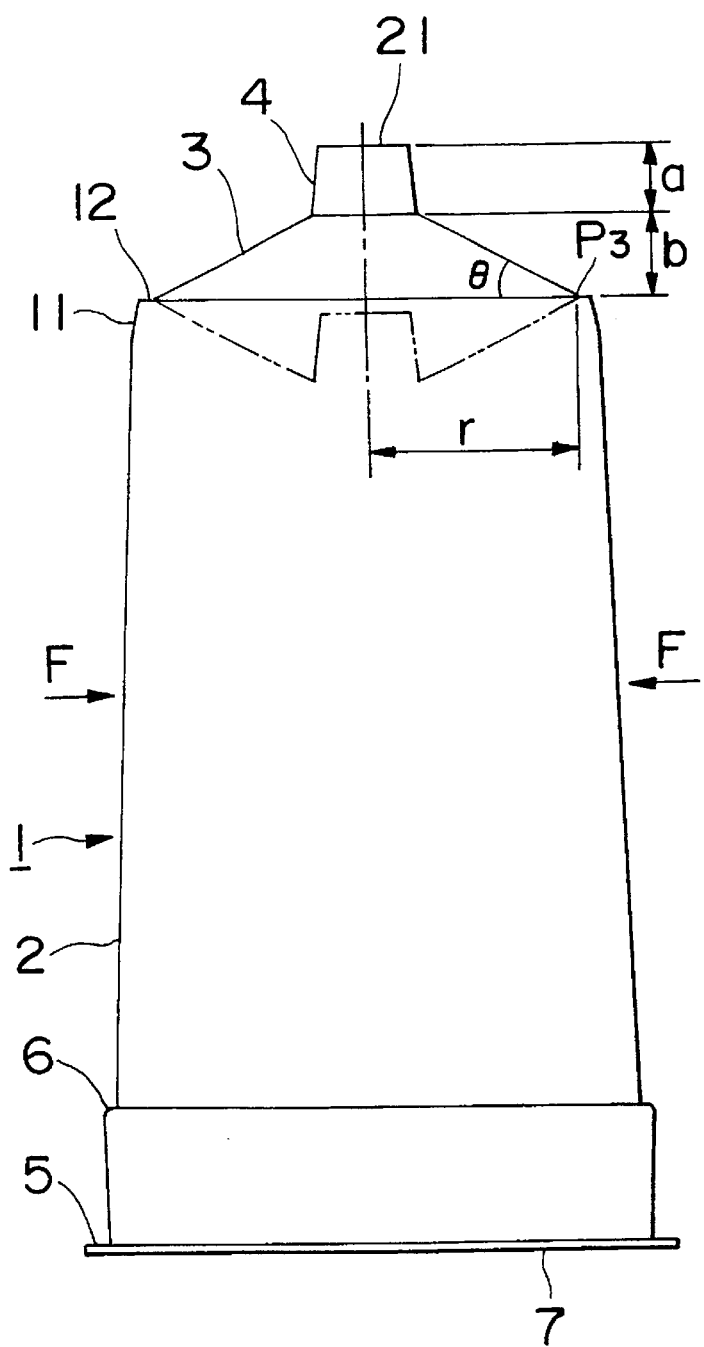
FIG. 18 is an elevational entire view showing breaking a part of the refilling container of Embodiment 5 in which a shoulder portion is projected upwardly from a barrel portion.
Figure 19:
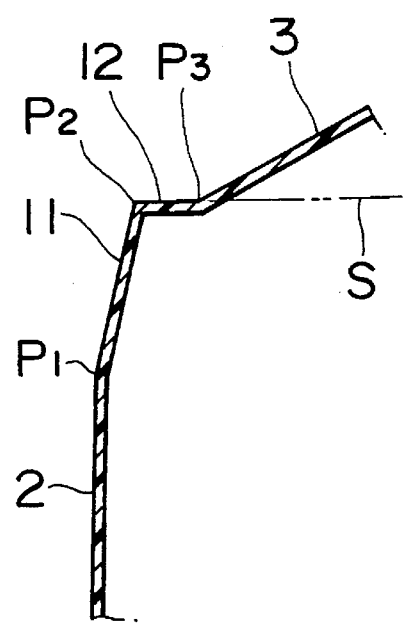
FIG. 19 is an enlarged view showing the end surface circumferential of a reinforcing ring used in a refilling container of Embodiment 5.

In the container body 1 of this refilling container, a reinforcing ring 12 is formed between a supplemental shoulder portion 11 and the shoulder portion 3 as shown in FIGS. 18 and 19. The reinforcing ring 12 is comprised of a flat surface (a virtual flat surface S including the entire circumferential edge of the shoulder portion 3) circularly surrounding the shoulder portion 3. In ease of this container body 1, a boundary between the supplemental shoulder portion 11 and the barrel portion 2 corresponds to a first refraction point $P_1$, a boundary between the supplemental shoulder portion 11 and the reinforcing ring 12 corresponds to a second refraction point $P_2$, and a boundary between the reinforcing ring 12 and the shoulder portion 3 corresponds to a third refraction point $P_3$.

The reinforcing ring 12 is positioned on a symmetric line based on the shoulder portion 3 as subsided in the barrel portion 2, so that the turn-over action of the shoulder portion 2 is facilitated. In addition, the reinforcing ring 12 reinforces the outer circumferential edge of the shoulder portion 3, so that the shoulder portion 3 can not be distorted when turned over and subsided in.

A container body 1 for containing 500 ml (total height: 160 mm, height size b of the shoulder portion 3: 12 mm, height size a of the nozzle cylinder 4: 10 mm) as shown in FIG. 18 was manufactured by thermo-form molding a single-layered polypropylene sheet having a thickness of 1.50 mm. The even thickness of the shoulder portion 3 of the resulting container body was about 0.37 mm, and the even thicknesses of the supplemental shoulder portion 11 and the reinforcing ring 12 each were about 0.16 mm.

FIGS. 20–23 each show another shape of the reinforcing ring 12, in which eases the shoulder portion 3 is also easily turned over and deformed due to the existence of the reinforcing ring 12 so that the shoulder portion 3 can not be distorted when turned over and subsided in.

FIG. 20 shows a convex-curved surface in which a reinforcing ring 12 projects upwardly. In this case, the supplemental shoulder portion 11 connected to the reinforcing ring 12 has also a convex-curved surface of which diameter reduces upwardly. A portion connected continuously to the shoulder portion 3 of this reinforcing ring 12 forms a sloped surface sloping downwardly toward the center of the container body 1.

FIG. 21 is comprised of a convex surface 14 in which a reinforcing ring 12 projects upwardly and a concave-curved surface 15 in which said reinforcing ring 12 projects downwardly. In this case, the continuously-connected portion of the convex-curved surface 14 to the concave-curved portion 15 forms a sloped surface sloping downwardly toward the center of the barrel portion 2.

FIG. 22 is comprised of three concave-curved surfaces 17a, 17b, 17c in which the shoulder portion 3 is shaped in the form of a ring. The concave-curved surfaces 17a, 17b, 17c function as a reinforcing rib, whereby the shoulder portion 3 can not be distorted when turned over and subsided in. In this case, the continuously-connected surface of the concave-curved surface 17a to the supplemental shoulder portion 11 forms a reinforcing ring 12. As shown in an enlarged view of FIG. 23, this reinforcing rib 12 is a substantially flat surface (a virtual flat surface S including the entire circumferential edge of the concave-curved surface 17a).

Figure 24:
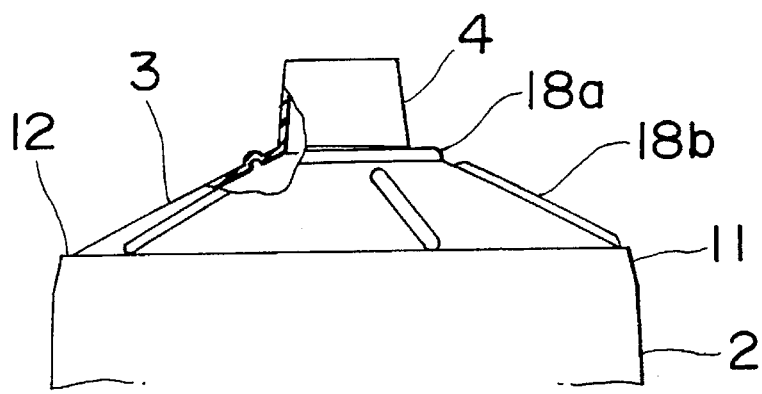
FIG. 24 is an elevation view showing the upper portion of a fourth modification example of the refilling container of Embodiment 5 in which a shoulder portion is projected upwardly from a barrel portion.
Figure 25:
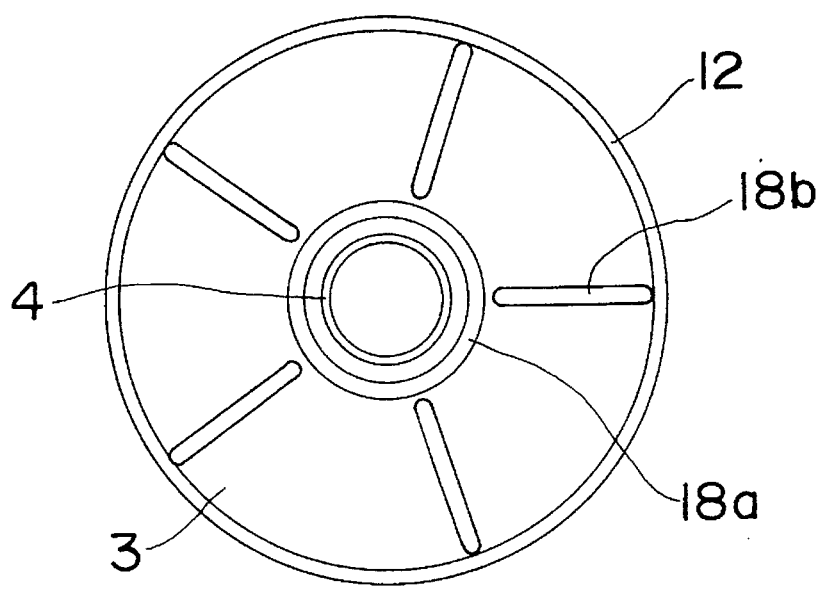
FIG. 25 is an elevation view showing the refilling container of said fouth modification example.
Figure 26A:
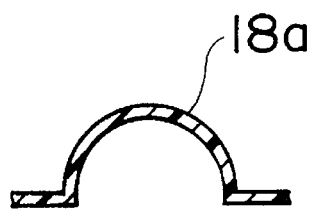
FIGS. 26A and 26B are a sectional view of a reinforcing rib, respectively.
Figure 26B:
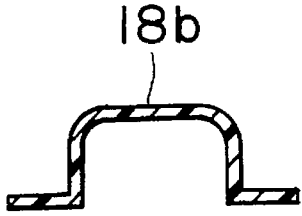

FIG. 24 is a partial elevational view showing an embodiment in which reinforcing ribs 18, 18b are provided in a shoulder portion 3, and FIG. 25 is a plane view thereof. The reinforcing rib 18a is provided in the form of a ring at the center portion of the shoulder portion 3 and the sectional shape thereof is a substantially semi-circular arch as shown in FIG. 26(A). The reinforcing rib 18b is arranged radially outside the reinforcing rib 18a and the sectional shape thereof is as shown in FIG. 26(B).

By forming these reinforcing ribs 18a, 18b, the shoulder portion 3 can not be distorted when turned over and subsided in. In this figure, the reinforcing ring 12 is formed on a plane surface as in FIG. 18, however, it can be shaped also like a shape as in FIG. 20 or 21.

Figure 27:
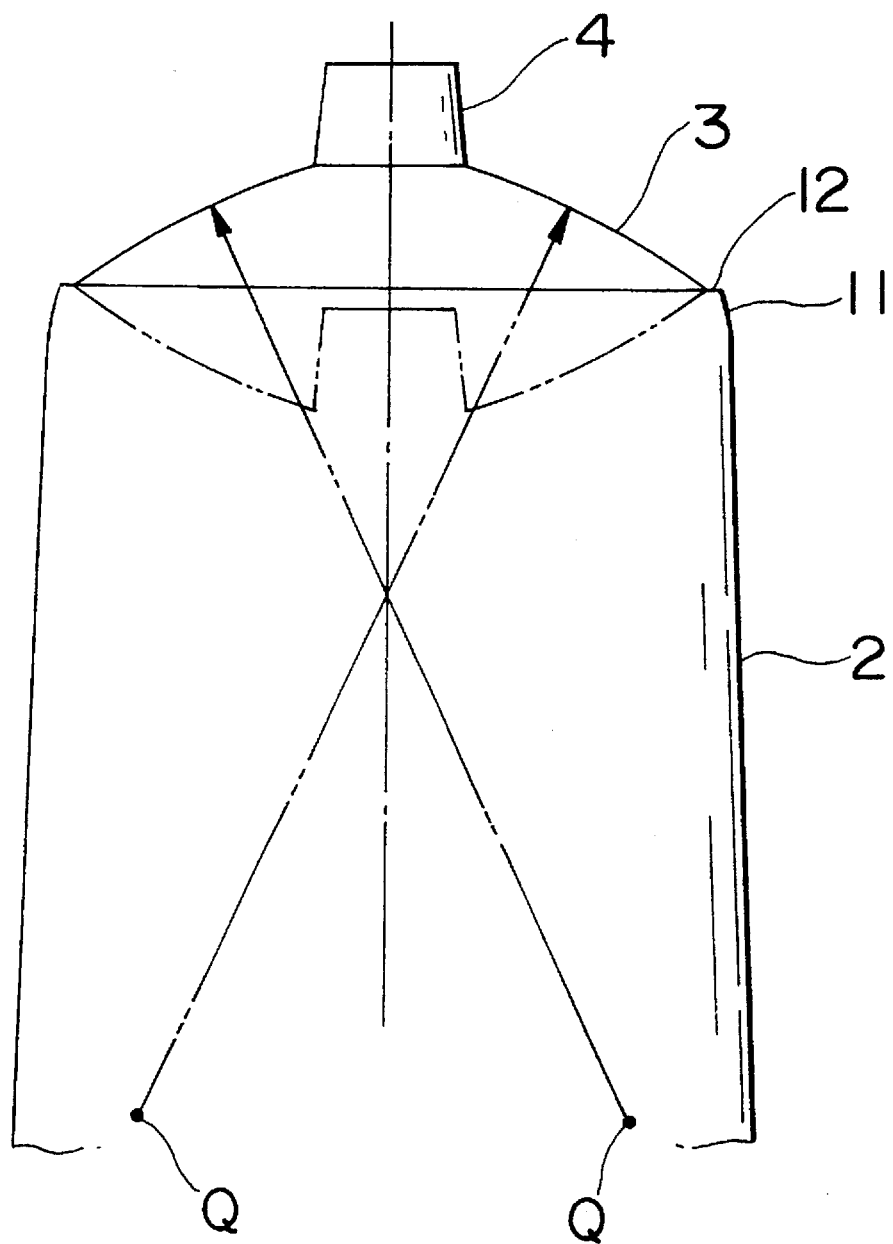
FIG. 27 is an elevation view showing the upper portion of a fifth modification example of the refilling container of Embodiment 5 in which a shoulder portion is projected upwardly from a barrel portion.

Further, as shown in FIG. 27, the container body 1 of which shoulder portion 3 forms a curved surface can be, of course, provided also with a reinforcing ring 12. In this figure, the centers Q of the curvature of the curved surface constituting the shoulder portion 3 are positioned at the opposite sides pinching the central axis of the barrel portion 2, however, the center of the curvature of the curved surface constituting the shoulder portion 3 may be positioned on the central axis of the barrel portion 2.

[Embodiment 6]

Figure 28:
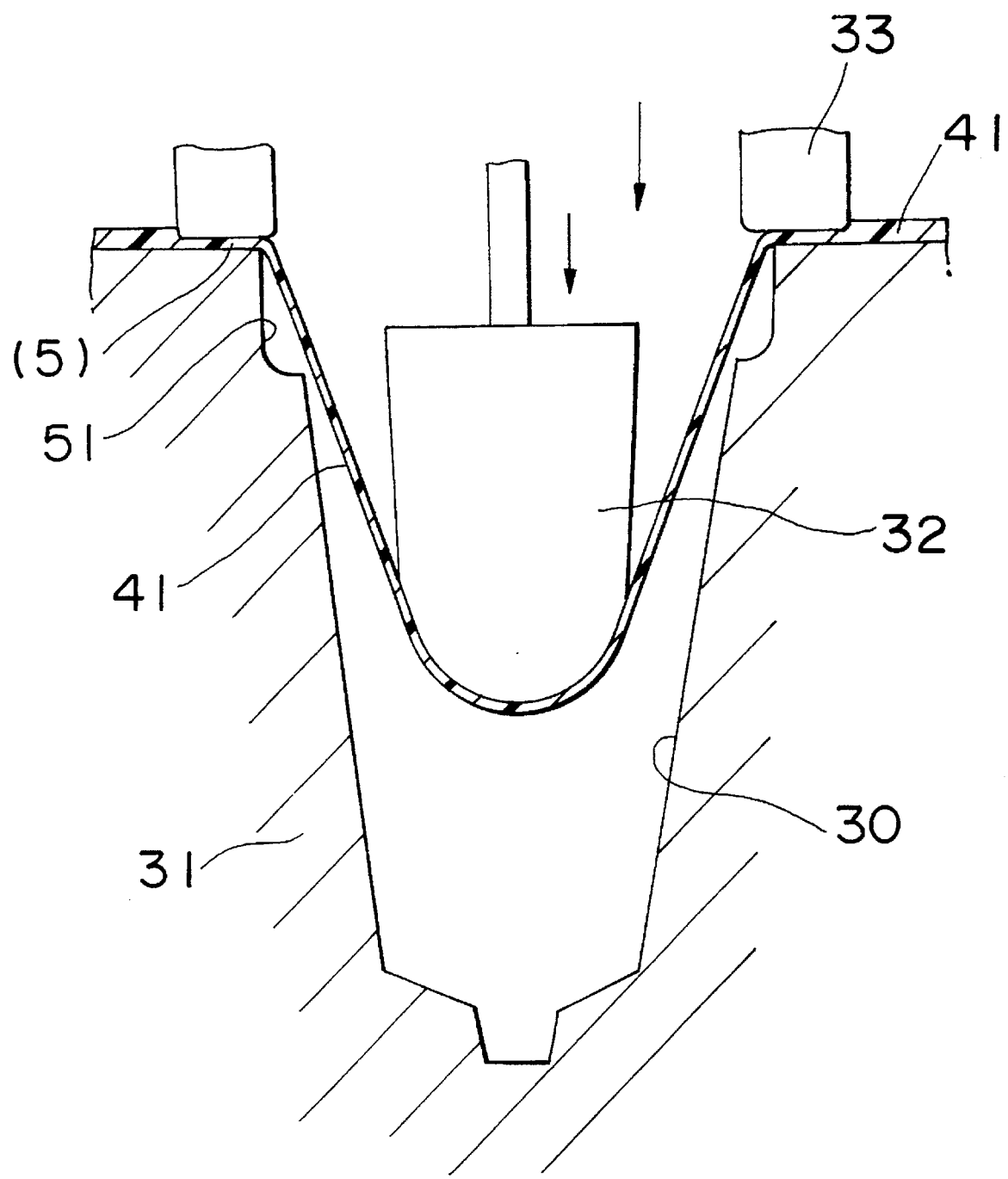
FIG. 28 is a view for explaining a manufactureing method according to the present invention.

A method for manufacturing the container body 1 of Embodiment 1 shown in FIG. 1 is explained in reference to FIG. 28. A molding mold 31 and a plug 32 are used in this method. A cavity 30 having the same shape as the container body 1 to be manufactured is formed in the molding mold 31 and is opened at a corresponding portion to the bottom of the container body 1. Inside the opening of the molding mold 31, a groove 51 going round the opening is previously formed. The plug 32 is shaped as shown in this figure so that it can penetrate into the cavity of the molding mold 30.

The manufacturing method according to this embodiment comprises the following four steps of:

(a) covering the opening of said cavity of the molding mold 31 with a synthetic resin sheet 41;

(b) pinching and pressing a predetermined portion of the synthetic resin sheet 41 by means of a sheet-pressing ring 33 having a inner diameter substantially-equal to or less than the diameter of the opening of the cavity, said predetermined portion being positioned to be the flange 5 of the container body 1, around the opening of said cavity and between said pressing ring and said molding mold;

(c) pressing said synthetic resin sheet 41 inwardly of said cavity 30 by means of said plug 32 under a heating condition while pressing said predetermined portion to be the flange 5 of the container body 1 by means of said pressing ring 33; and (d) generating a negative pressure inside the cavity 30 at said synthetic resin sheet 41, as a boundary, in the state of the same sheet being pressed by means of said plug 32 to thereby adhere the synthetic resin sheet 41 to the inner surface of said cavity 30.

When manufacturing a container body 1 according to this method, a tension does not act on the predetermined portion to be the flange 5 during thermoforming, so that the same portion is not stretched and oriented. Thus, a container body 1 of which flange 5 is formed of a non-oriented resin can be manufactured. This does not allow to break radially the flange 5 even if an impact caused by such as dropping is impressed thereon, While, the circumferential portion of the edge of the opening positioned at the lower end of the barrel portion 2 of the container body 1 is stretched in both axial and radial directions of the barrel portion 2, so that the resin forming said circumferential portion may be oriented in longitudinal and horizontal directions. Thus, the strength circumferential of the end of the opening at the lower end of the barrel portion 2 can be increased to cause hard to generate a break even if an impact caused by such as dropping is impressed thereon.

According to this method, a container body 1 for containing 500 ml (total height: 160 mm, height size b of the shoulder portion 3: 12 mm, height size a of the nozzle cylinder 4: 10 mm) as shown in FIG. 2 was manufactured by thermoforming a single-layered polypropylene sheet having a thickness of 1.50 mm. The even thickness of the shoulder portion 3 of the resulting container body was about 0.37 mm and the even thickness of the continuously-connected portion of the barrel portion 2 to the shoulder portion 3, or the upper end portion of the barrel portion 2, was about 0.16 mm.

After said 500 ml container body 1 was filled with a liquid detergent, as a content, and the seal film 7 was molten-adhered to the flange 5, a dropping test from a height of about 1 m was carried out. As a result, no damages such as radial breakage of the flange 5 or circumferential breakage of the opening at the lower end of the barrel portion 2 were generated. In this case, there was used a layered film, as said seal film 7, prepared by laminating a non-stretched polypropylene layer having a thickness of 0.06–0.08 mm, a nylon layer having a thickness of 0.015–0.025 mm and a polyethylene terephthalate layer having a thickness of 0.012 mm in this order from the side of the container body 1.

<Comparative Embodiment>

Figure 29:
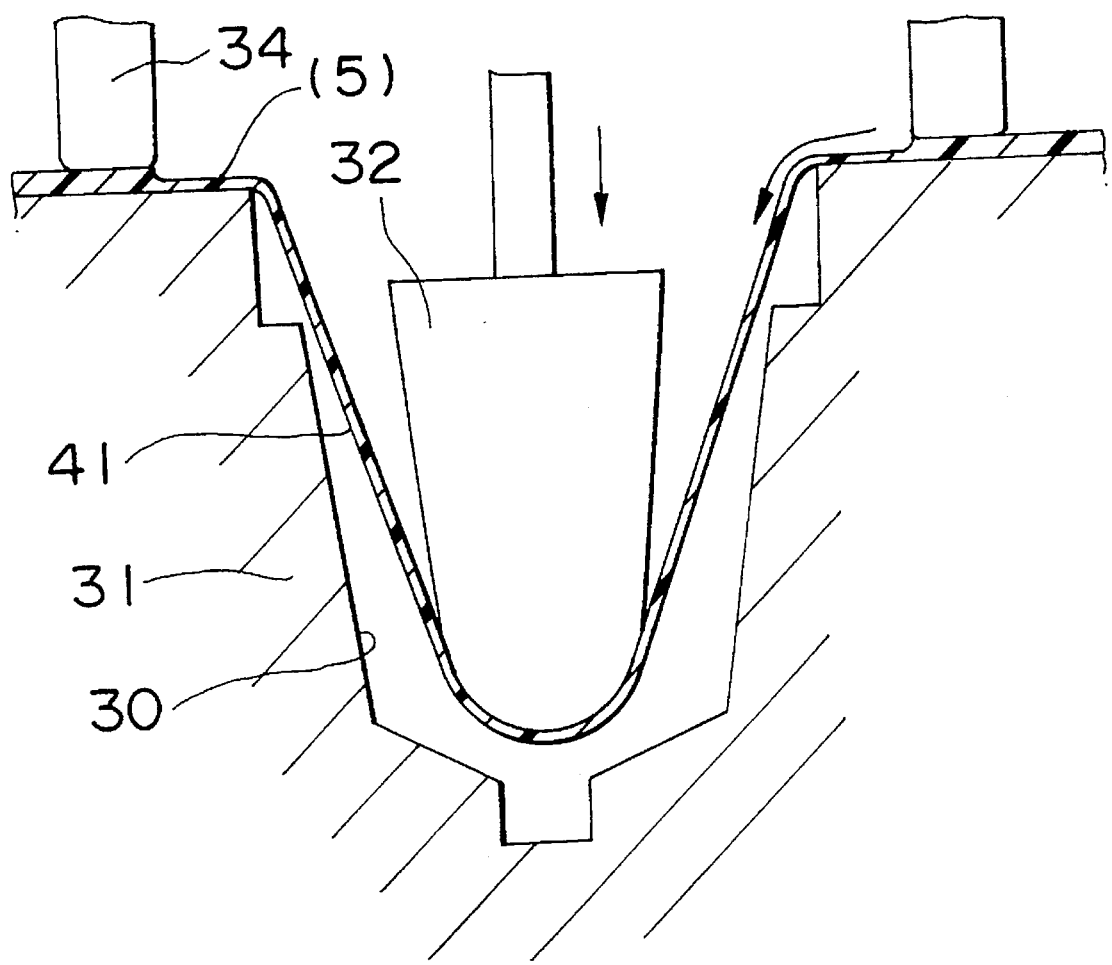
FIG. 29 is a view for explaining a comparative-manufactureing method.

FIG. 29 shows a manufacturing method according to Comparative Example. In Comparative Embodiment, there were used the same molding mold 31 and the same plug 32 as those mentioned above, respectively, and a sheet-pressing ring 34 of which inner diameter is larger than the outer diameter of the flange 5 of a container body 1 to be manufactured.

Thermoforming was effected under the same conditions as mentioned above, except that the synthetic resin sheet 41 positioned outside a predetermined portion to be the flange 5 was pinched and pressed around the opening of the cavity 30 by means of said sheet-pressing ring 34 and said molding mold 31.

In this method according to Comparative Embodiment, a corresponding portion to the flange 5 was also extended to be stretched and oriented in radial direction. The thus obtained container body 1 is broken at the flange 5 in the orientation direction of the resin, or radially, due to an impact such as dropping.

Industrial Applicability

A refilling container according to the present invention is superior in self-shape holdability; it can refill a content easily; it is advantageous in transportation, storage, display and the like; and it can be disposed easily. Accordingly, it is useful as a refilling container for containing various liquid or creamy contents such as liquid shampoos, liquid rinses and other liquid cosmetics, and liquid foods.

We claim:

1. A refilling container, comprising:
    a thermoformed container body made of a synthetic resin sheet, said container body having:
        a barrel portion having a lower end formed with an opening and an upper end formed opposite the lower end,
        a flange positioned along the lower end and substantially in a common plane with the opening,
        a flexible shoulder portion integrally formed along the upper end of the barrel portion,
        a nozzle portion integrally formed with and extending away from the shoulder portion, and
        a platen integrally formed with a top section of said nozzle portion, wherein said shoulder portion, said nozzle portion and said platen are movable with respect to the barrel portion between an extended position and a subsided position in which said shoulder portion, said nozzle portion and said platen are disposed substantially within an interior of said barrel portion; and
        a seal film connected to the flange and being formed across the lower end of the barrel portion to sealably close the opening.

2. A refilling container according to claim 1, wherein said shoulder portion is linearly tapered.

3. A refilling container according to claim 1, wherein said shoulder portion is arcuately tapered.

4. A refilling container according to claim 1, wherein the height size of said nozzle is smaller than the height size of said shoulder portion.

5. A refilling container according to claim 1, wherein a thickness size of said platen is smaller than a thickness size of said nozzle portion.

6. A refilling container according to claim 1, wherein said barrel portion has a tapered cylindrical shape so that a diameter of the taper reduces upwardly, and wherein an outwardly projected step portion is formed at the lower end portion of the barrel portion and an outer diameter of the step portion is larger than an inner diameter of the opening positioned at the lower end of said barrel portion.

7. A refilling container according to claim 1, wherein at least one tapered supplemental shoulder portion, of which taper reduces upwardly in diameter, is formed between said barrel portion and said shoulder portion.

8. A refilling container according to claim 7, wherein a thickness t4 of said barrel portion, a thickness t5 of said at least one supplemental shoulder portion, a thickness t6 of said shoulder portion and a thickness t7 of said nozzle portion satisfy a size relation wherein: $t6>t4\geq t5>t7$.

9. A refilling container according to claim 7, wherein a thickness t1 of said flange, thickness t2 of said step portion, a thickness t3 of the lower portion of said barrel portion, a thickness t4 of the upper portion of said barrel portion, a thickness t5 of said at least one supplemental shoulder portion, a thickness t6 of said shoulder portion and a thickness t7 of said nozzle portion satisfy a size relation wherein: $t1>t6>t2>t3\geq t4\geq t5>t7$.

10. A refilling container according to claim 9, wherein the thickness of said flange is in the range of about 0.4 mm–1.0 mm.

11. A refilling container according to claim 1, further comprising a reinforcing ring circularly surrounding said shoulder portion and formed between said barrel portion and said shoulder portion.

12. A refilling container according to claim 11 wherein said reinforcing ring has a substantially flat surface including an entire outer circumferential edge of said shoulder portion.

13. A refilling container according to claim 11, wherein said reinforcing ring has a sloped surface sloping downwardly toward a center of the shoulder portion.

14. A refilling container according to claim 11, wherein said reinforcing ring has an upwardly projecting convex-curved surface.

15. A refilling container according to claim 1, wherein a reinforcing rib is formed on said shoulder portion.

16. A refilling container according to claim 1, wherein a projected piece projected downwardly relative to said seal film is formed circumferentially of said flange.

17. A refilling container according to claim 16 wherein a downwardly projected size of the projected piece is set to a larger value than a deflection value of said seal film deflected downwardly when a content is filled in said container body.

18. A refilling container according to claim 1, wherein a portion of said flange is formed of a non-oriented resin.

19. A method for manufacturing a refilling container, said refilling container having a container body made of a resin,
    said container body being provided with a cylindrical barrel portion; an outwardly overhanging-flange formed integrally with and circumferentially of an edge of an opening positioned along a lower end of the barrel portion; a flexible shoulder portion integrally formed with an upper end of said barrel portion; a cylindrical nozzle cylinder having a top integrally formed with and extending away from a center portion of the shoulder portion; and a platen integrally formed with the top of said nozzle cylinder, wherein the shoulder portion, the nozzle cylinder and the platen are movable with respect to the cylindrical barrel portion between an extended position and a subsided position in which the shoulder portion, the nozzle cylinder and the platen are disposed substantially within an interior of the cylindrical barrel portion, said refilling contained being formed:

using a molding mold having a cavity having a shape matching a shape of said container body and having an opening corresponding to the lower end of said container body, said molding mold being cooperable with a plug capable of penetrating into the cavity of the molding mold, said method comprising the steps of:
(a) covering the opening of said cavity of said molding mold with a synthetic resin sheet;
(b) pinching a predetermined portion of the synthetic resin sheet, said predetermined portion forming at least a circumferential edge portion of the flange of the container body, said predetermined portion being formed around the opening of said cavity and between said molding mold and a pressing ring;
(c) pressing said synthetic resin sheet inwardly of said cavity using said plug under a heated condition to form said container body, including said shoulder portion, the nozzle cylinder and the platen, while pressing and forming said predetermined portion of said synthetic resin sheet into the flange of said container body using said pressing ring;
(d) generating a pressure difference between the inside and the outside of said synthetic resin sheet during the step of pressing using said plug to thereby adhere said synthetic resin sheet to the inner surface of said cavity; and
(e) forming a seal film connected to the flange and being formed across the lower end of the barrel portion to sealably close the opening at the lower end of the barrel portion of the container body.

20. A method for manufacturing a refilling container according to claim 19, wherein said sheet-pressing ring has a inner diameter no greater than the diameter of the opening of said cavity.

21. A method for manufacturing a refilling container according to claim 19, wherein the circumferential portion of the edge of the opening at the lower end of said barrel portion is formed of a resin oriented in both axial and radial directions of said barrel portion.

22. A method for manufacturing a refilling container, said refilling container having a container body made of a resin, said container body being provided with a cylindrical barrel portion; an outwardly overhanging-flange formed integrally with and circumferentially of an edge of an opening positioned along a lower end of the barrel portion; a flexible shoulder portion integrally formed with an upper end of said barrel portion; a cylindrical nozzle cylinder having a top integrally formed with and extending away from a center portion of the shoulder portion; and a platen integrally formed with the top of said nozzle cylinder, wherein the shoulder portion, the nozzle cylinder and the platen are movable with respect to the cylindrical barrel portion between an extended position and a subsided position in which the shoulder portion, the nozzle cylinder and the platen are disposed substantially within an interior of the cylindrical barrel portion, said resin container body being formed using a molding mold having a cavity having a shape matching a shape of said container body and having an opening corresponding to the lower end of said container body, an inside of the opening of the cavity being provided with a groove formed about the opening of the cavity; said molding mold being cooperable with a plug capable of penetrating into the cavity of the molding mold, said method comprising the steps of:
(a) covering the opening of said cavity of said molding mold with a synthetic resin sheet;
(b) pinching the synthetic resin sheet circumferential of the opening of said cavity between said molding mold and a sheet-pressing ring;
(c) pressing said synthetic resin sheet inwardly of said cavity using said plug under a heated condition to form said container body, including said shoulder portion, said nozzle cylinder and said platen, while pressing said synthetic resin sheet with said pressing ring;
(d) generating a pressure difference between the inside and the outside of said synthetic resin sheet during the step of pressing using said plug to thereby adhere said synthetic resin sheet to the inner surface of said cavity; and
(e) forming a seal film connected to the flange and being formed across the lower end of the barrel portion to sealably close the opening at the lower end of the barrel portion of the container body.

* * * * *